United States Patent
Irie et al.

(10) Patent No.: US 10,466,553 B2
(45) Date of Patent: Nov. 5, 2019

(54) LIQUID CRYSTAL DISPLAY APPARATUS AND METHOD FOR DRIVING LIQUID CRYSTAL DISPLAY APPARATUS

(71) Applicant: Sakai Display Products Corporation, Sakai-shi, Osaka (JP)

(72) Inventors: Kentaro Irie, Sakai (JP); Masae Kitayama, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/737,486

(22) PCT Filed: Jun. 23, 2015

(86) PCT No.: PCT/JP2015/068078
§ 371 (c)(1),
(2) Date: Dec. 18, 2017

(87) PCT Pub. No.: WO2016/207982
PCT Pub. Date: Dec. 29, 2016

(65) Prior Publication Data
US 2018/0188585 A1    Jul. 5, 2018

(51) Int. Cl.
*G02F 1/1362* (2006.01)
*G02F 1/1343* (2006.01)
(Continued)

(52) U.S. Cl.
CPC ........ *G02F 1/13624* (2013.01); *G02F 1/1368* (2013.01); *G02F 1/134336* (2013.01);
(Continued)

(58) Field of Classification Search
CPC ........... G09G 3/3648; G09G 2320/028; G09G 2320/0233; G09G 2300/0447;
(Continued)

(56) References Cited

U.S. PATENT DOCUMENTS 5,900,863 A * 5/1999 Numazaki ............... G06F 3/011
345/156
6,958,791 B2 * 10/2005 Shimoshikiryo ..........................
G02F 1/134336
349/173
(Continued)

FOREIGN PATENT DOCUMENTS

JP    2004-62146 A    2/2004
JP    2006-133577 A    5/2006
(Continued)

OTHER PUBLICATIONS

Kim et al., 82" Ultra Definition LCD Using New Driving Scheme and Advanced Super PVA Technology, SID Symposium Digest of Technical Papers, May 2008, 39(1):196-199.
(Continued)

*Primary Examiner* — Michael J Jansen, II
(74) *Attorney, Agent, or Firm* — Rudy J. Ng; Bret E. Field; Bozicevic, Field & Francis LLP

(57) ABSTRACT

Pixels P arranged in a matrix shape have at least two sub-pixels defined by including an electrode pair of a sub-pixel electrode and a counter electrode facing each other through a liquid crystal layer. Regarding at least two sub-pixels included in the pixel P, a voltage difference between voltages applied to the liquid crystal layer through the electrode pair, a brightness difference or a luminance difference varies depending on an arrangement position of the pixel P in a row direction and/or column direction.

10 Claims, 19 Drawing Sheets

(51) Int. Cl.
  *G02F 1/1368* (2006.01)
  *G09G 3/36* (2006.01)
  *G09G 3/20* (2006.01)

(52) U.S. Cl.
  CPC ..... *G02F 1/136286* (2013.01); *G09G 3/2096* (2013.01); *G09G 3/3648* (2013.01); *G09G 3/3651* (2013.01); *G02F 2001/134345* (2013.01); *G02F 2001/134354* (2013.01); *G09G 2300/0439* (2013.01); *G09G 2300/0447* (2013.01); *G09G 2300/0495* (2013.01); *G09G 2300/0842* (2013.01); *G09G 2320/028* (2013.01); *G09G 2320/0673* (2013.01); *G09G 2370/08* (2013.01)

(58) Field of Classification Search
  CPC ... G09G 2300/0443; G09G 2300/0876; G09G 2320/043; G09G 2320/0242; G09G 2320/0276; G09G 2320/0626; G09G 3/36; G09G 2320/0673; G09G 2320/068; G09G 2320/0686
  See application file for complete search history.

(56) References Cited

U.S. PATENT DOCUMENTS

| | | | | |
|---|---|---|---|---|
| 7,079,214 B2 * | 7/2006 | Shimoshikiryo | | G02F 1/134336 349/129 |
| 7,283,192 B2 * | 10/2007 | Shimoshikiryo | | G02F 1/134336 349/129 |
| 7,688,393 B2 * | 3/2010 | Ueda | ................. | G02F 1/134309 349/38 |
| 7,782,346 B2 * | 8/2010 | Akiyama | ........... | G02F 1/134309 345/50 |
| 7,883,415 B2 * | 2/2011 | Larsen | .................... | A63F 13/10 345/7 |
| 7,911,498 B2 * | 3/2011 | Shen | .................... | G09G 3/2007 348/177 |
| 8,149,101 B2 * | 4/2012 | Ueno | .................... | G06F 21/316 340/506 |
| 8,159,432 B2 * | 4/2012 | Naruse | ................. | G09G 3/3648 345/698 |
| 8,576,261 B2 * | 11/2013 | Yoshida | .............. | G09G 3/3648 345/690 |
| 8,698,850 B2 * | 4/2014 | Irie | ...................... | G09G 3/3648 345/690 |
| 8,890,812 B2 * | 11/2014 | Billerbeck | .............. | G06F 3/017 345/156 |
| RE45,283 E * | 12/2014 | Shimoshikiryo | | G02F 1/134336 349/129 |
| 8,963,831 B2 * | 2/2015 | Coulon | ............... | G06F 21/6245 345/156 |
| 8,976,098 B2 * | 3/2015 | Fan | ......................... | G02F 1/133 345/690 |
| 8,994,653 B2 * | 3/2015 | Gardenfors | ........... | G06F 1/1626 345/156 |
| 9,076,360 B2 * | 7/2015 | Kim | ....................... | G09G 3/003 |
| 9,099,035 B2 * | 8/2015 | Shin | ...................... | G09G 3/3225 |
| 9,099,037 B2 * | 8/2015 | Shin | ...................... | G09G 3/3233 |
| RE46,025 E * | 6/2016 | Shimoshikiryo | | G02F 1/134336 |
| 9,514,698 B2 * | 12/2016 | Song | .................... | G09G 3/3659 |
| 9,564,095 B2 * | 2/2017 | Irie | ........................ | G09G 3/003 |
| 9,634,040 B2 * | 4/2017 | Guo | ...................... | H01L 27/1255 |
| 9,715,855 B2 * | 7/2017 | Huang | .................... | G09G 3/36 |
| 9,740,068 B2 * | 8/2017 | Ohishi | ............. | G02F 1/136204 |
| 9,754,547 B2 * | 9/2017 | Shigeta | ............. | G02F 1/136213 |
| 9,792,867 B2 * | 10/2017 | Ohishi | ............. | G02F 1/136286 |
| 9,858,868 B2 * | 1/2018 | Kohtoku | .................... | G06F 3/03 |
| 9,866,667 B2 * | 1/2018 | Gardenfors | ........... | G06F 1/1626 |
| 9,870,740 B2 * | 1/2018 | Park | ...................... | G09G 3/342 |
| 9,898,078 B2 * | 2/2018 | Peana | .................... | G06F 3/013 |
| 10,096,287 B2 * | 10/2018 | Sung | .................... | G09G 3/3275 |
| 2003/0227429 A1 | 12/2003 | Shimoshikiryo | | |
| 2005/0059488 A1 * | 3/2005 | Larsen | .................... | A63F 13/10 463/36 |
| 2005/0213015 A1 * | 9/2005 | Shimoshikiryo | | G02F 1/134336 349/144 |
| 2006/0215066 A1 * | 9/2006 | Ueda | .................... | G02F 1/134309 349/38 |
| 2006/0256271 A1 * | 11/2006 | Shimoshikiryo | | G02F 1/134336 349/144 |
| 2007/0132661 A1 * | 6/2007 | Shen | .................... | G09G 3/2007 345/3.4 |
| 2007/0132895 A1 * | 6/2007 | Shen | .................... | G09G 3/2007 349/1 |
| 2008/0049052 A1 * | 2/2008 | Akiyama | ......... | G02F 1/134309 345/694 |
| 2009/0109015 A1 * | 4/2009 | Ueno | .................... | G06F 21/316 340/500 |
| 2009/0213053 A1 * | 8/2009 | Naruse | ................. | G09G 3/3648 345/88 |
| 2011/0221760 A1 * | 9/2011 | Irie | ...................... | G09G 3/3648 345/589 |
| 2011/0234605 A1 * | 9/2011 | Smith | ................ | G02B 27/2214 345/522 |
| 2011/0242149 A1 | 10/2011 | Yoshida et al. | | |
| 2012/0075166 A1 * | 3/2012 | Marti | ...................... | G06F 3/011 345/1.1 |
| 2012/0229723 A1 * | 9/2012 | Katsuta | ............... | G02F 1/13624 349/42 |
| 2012/0256971 A1 * | 10/2012 | Shin | ...................... | G09G 3/3233 345/690 |
| 2012/0306936 A1 * | 12/2012 | Shin | ...................... | G09G 3/3225 345/690 |
| 2013/0021240 A1 * | 1/2013 | Coulon | ............... | G06F 21/6245 345/156 |
| 2013/0027439 A1 * | 1/2013 | Kim | ........................ | G09G 3/003 345/690 |
| 2013/0222236 A1 * | 8/2013 | Gardenfors | ........... | G06F 1/1626 345/156 |
| 2014/0118255 A1 * | 5/2014 | Billerbeck | .............. | G06F 3/017 345/158 |
| 2014/0191933 A1 * | 7/2014 | Fan | ......................... | G02F 1/133 345/89 |
| 2015/0109268 A1 * | 4/2015 | Huang | .................... | G09G 3/36 345/206 |
| 2015/0116301 A1 * | 4/2015 | Irie | ........................ | G09G 3/003 345/212 |
| 2015/0316824 A1 * | 11/2015 | Ohishi | ............. | G02F 1/136204 257/72 |
| 2015/0319280 A1 * | 11/2015 | Gardenfors | ........... | G06F 1/1626 455/566 |
| 2015/0357351 A1 * | 12/2015 | Guo | ...................... | H01L 27/1255 257/379 |
| 2015/0379948 A1 * | 12/2015 | Ohishi | ............. | G02F 1/136286 345/92 |
| 2016/0012793 A1 * | 1/2016 | Shigeta | ............. | G02F 1/136213 345/205 |
| 2016/0078819 A1 * | 3/2016 | Park | ...................... | G09G 3/342 345/156 |
| 2016/0104435 A1 * | 4/2016 | Kohtoku | .................... | G06F 3/03 345/690 |
| 2016/0140907 A1 * | 5/2016 | Kohtoku | .................... | G09G 3/32 345/207 |
| 2016/0202758 A1 * | 7/2016 | Peana | .................... | G06F 3/013 345/601 |
| 2016/0225333 A1 * | 8/2016 | Song | .................... | G09G 3/3659 |
| 2017/0031434 A1 * | 2/2017 | Files | .................... | G06F 3/013 |
| 2017/0110059 A1 * | 4/2017 | Sung | .................... | G09G 3/3275 |
| 2017/0329399 A1 * | 11/2017 | Azam | .................... | G06F 3/013 |
| 2018/0096655 A1 * | 4/2018 | Pyeon | .................... | G09G 3/3233 |

(56) References Cited

U.S. PATENT DOCUMENTS

| | | | | |
|---|---|---|---|---|
| 2018/0131801 A1* | 5/2018 | Gardenfors | ............ | G06F 1/1626 |
| 2018/0136724 A1* | 5/2018 | Peana | ..................... | G06F 3/013 |
| 2018/0188585 A1* | 7/2018 | Irie | ......................... | G02F 1/133 |

FOREIGN PATENT DOCUMENTS

| | | |
|---|---|---|
| JP | 2006-276120 A | 10/2006 |
| WO | WO2011065058 A1 | 6/2011 |
| WO | WO2012093630 A1 | 7/2012 |

OTHER PUBLICATIONS

Office Action for U.S. Appl. No. 15/329,492 dated Sep. 7, 2018, 9 pages.

* cited by examiner

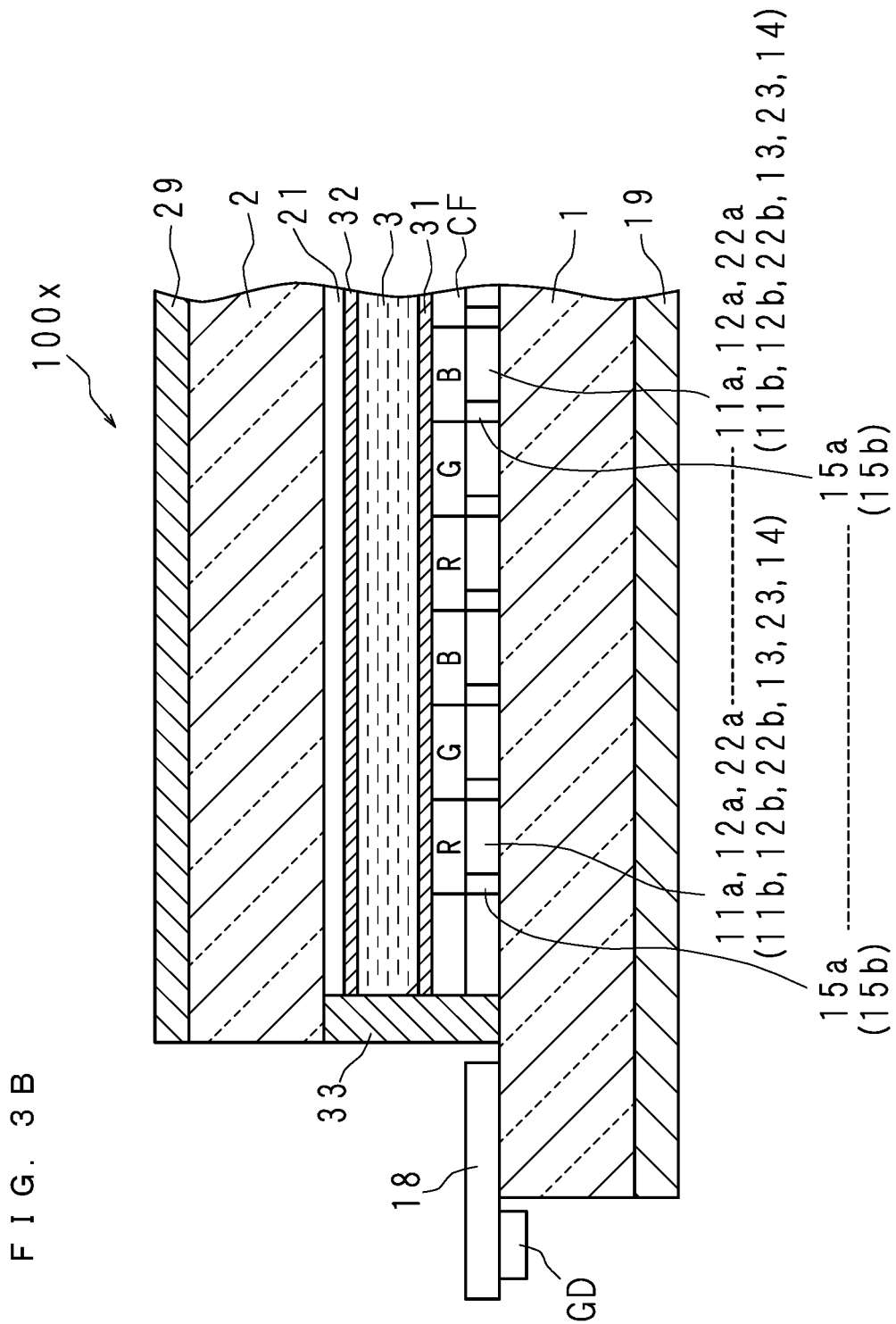

F I G. 7

| RELATIVE POSITION ON DISPLAY SCREEN | REGION | VALUE OF k (EFFECTIVE VOLTAGE = 3V) |
|---|---|---|
| −1.00 | Ah | 0.32 |
| −0.75 | Bh | 0.28 |
| −0.50 | Ch | 0.22 |
| −0.25 | Dh | 0.14 |
| 0.00 | Eh | 0.11 |
| 0.25 | Fh | 0.14 |
| 0.50 | Gh | 0.22 |
| 0.75 | Hh | 0.28 |
| 1.00 | Ih | 0.32 |

LIQUID CRYSTAL DISPLAY APPARATUS AND METHOD FOR DRIVING LIQUID CRYSTAL DISPLAY APPARATUS

This application is the national phase under 35 U.S.C. § 371 of PCT International Application No. PCT/JP2015/068078 which has an International filing date of Jun. 23, 2015 and designated the United States of America.

FIELD

The present invention relates to a liquid crystal display apparatus, and particularly, to a liquid crystal display apparatus and a method for driving a liquid crystal display apparatus that improve viewing angle dependency of gamma characteristics.

BACKGROUND

A liquid crystal display apparatus is a flat panel display apparatus having excellent features such as high definition, reduction of thickness and weight, low power consumption and the like. The liquid crystal display apparatus is widely used for a thin type television, a personal computer monitor, a digital signage and the like.

Conventionally, a TN (twisted nematic) mode liquid crystal display apparatus, which has been generally used in the art, allows for excellent manufacturing productivity. On the other hand, the TN mode liquid crystal display apparatus has problems in viewing angle characteristics related to screen display. For example, when viewing the display screen from an oblique direction with respect to a normal line, a contrast ratio is remarkably decreased in the TN mode liquid crystal display apparatus, and a luminance difference between gradations becomes remarkably unclear. In addition, a so-called gradation inversion phenomenon is often observed. In gradation inversion phenomenon, there are portions that appear bright (or dark) when viewing the display screen from a front and appear dark (or bright) when viewing it from the oblique direction with respect to the normal line.

As a liquid crystal display apparatus for improving the above-described problems of the viewing angle characteristics, there is a liquid crystal display apparatus for performing display in a display mode such as an IPS (in-plan switching) mode, an MVA (multi domain vertical alignment) mode or the like. As a technique for improving the viewing angle characteristics, techniques that realize the display mode of these liquid crystal display apparatuses are widely used.

One problem of the viewing angle characteristics is that the gamma characteristic, representing gradation dependency of the display luminance, depends on an angle of a visual line with respect to the normal line of the display screen (hereinafter referred to as visual angle dependency of the gamma characteristics). This problem is that a gradation display state varies depending on an observation direction with respect to the display screen, and that the gamma characteristic is differently observed between a case where the observation direction is along the normal line of the display screen and a case where the observation direction is the oblique direction with respect to the normal line.

'82" Ultra Definition LCD Using New Driving Scheme and Advanced Super PVA Technology' by Sang Soo Kim, Bong Hyun You, Jung Hwan Cho, Sung Jae Moon, Brian H. Berkeley and Nam Deog Kim, SID Symposium Digest of Technical Papers, May 2008, Volume 39, Issue 1, p. 196-199 discloses a liquid crystal display apparatus that improves the visual angle dependency of gamma characteristics (referred to as viewing angle dependency in some documents). In the liquid crystal display apparatus described in '82" Ultra Definition LCD Using New Driving Scheme and Advanced Super PVA Technology' by Sang Soo Kim, Bong Hyun You, Jung Hwan Cho, Sung Jae Moon, Brian H. Berkeley and Nam Deog Kim, SID Symposium Digest of Technical Papers, May 2008, Volume 39, Issue 1, p. 196-199, each pixel includes two sub-pixels, and a discharge capacitor (Cdown) is provided in one sub-pixel. Sub-pixel electrodes of each of the two sub-pixels are connected to a data signal line (source signal line) through a TFT 1 and a TFT 2. A scanning signal is applied to control electrodes of the TFT 1 and TFT 2 from a scanning signal line. Regarding the discharge capacitor, a discharge capacitor electrode opposed to a counter electrode is connected to the sub-pixel electrode of one sub-pixel through a TFT 3. Then, a control electrode of the TFT 3 is connected to a scanning signal line of the next line.

In the liquid crystal display apparatus described in '82" Ultra Definition LCD Using New Driving Scheme and Advanced Super PVA Technology' by Sang Soo Kim, Bong Hyun You, Jung Hwan Cho, Sung Jae Moon, Brian H. Berkeley and Nam Deog Kim, SID Symposium Digest of Technical Papers, May 2008, Volume 39, Issue 1, p. 196-199, regarding each pixel, a scanning signal delayed by one horizontal scanning time from the scanning signal for the pixel is applied to the control electrode of the TFT 3. As such, the sub-pixel electrode and the discharge capacitor electrode of one sub-pixel are connected with each other depending on a signal delayed in time from the scanning signal. Thereby, an effective voltage applied to a liquid crystal layer by each of the two sub-pixels can be changed. In this case, each pixel is observed in a state in which different gamma characteristics for each sub-pixel are harmonized with each other so that the visual angle dependency of the gamma characteristics is improved.

SUMMARY

However, according to the technique disclosed in '82" Ultra Definition LCD Using New Driving Scheme and Advanced Super PVA Technology' by Sang Soo Kim, Bong Hyun You, Jung Hwan Cho, Sung Jae Moon, Brian H. Berkeley and Nam Deog Kim, SID Symposium Digest of Technical Papers, May 2008, Volume 39, Issue 1, p. 196-199, when observing the display screen from a direction intersecting with the normal line as compared with the case of observing the display screen in a direction along the normal line from the front, a deterioration in the gamma characteristics is suppressed without considering a difference in an angle in which the above-described two directions intersect with each other.

Therefore, there is a problem that, for example, when observing the display screen in a situation in which an angle formed by the normal line at an edge portion of the display screen and the visual line of a viewer is relatively large, suppression of degradation in the gamma characteristic is insufficient as an observation object position on the display screen approaches an end portion thereof.

In consideration of the above-described circumstances, it is an object of the present invention to provide a liquid crystal display apparatus and a method for driving a liquid crystal display apparatus, which allow a degradation in gamma characteristics to be effectively suppressed, even when an angle formed by a normal line at an observation object position on a display screen and a visual line of a viewer is relatively large.

A liquid crystal display apparatus according to one embodiment of the present invention includes a liquid crystal layer and a plurality of electrode pairs for applying a voltage to the liquid crystal layer. Pixels, each of which has a plurality of sub-pixels, each of which is defined by including an electrode pair of a sub-pixel electrode and a counter electrode facing each other through the liquid crystal layer, are arranged in a matrix shape. A voltage difference between the voltages applied to the liquid crystal layer through the electrode pair included in each of at least a first sub-pixel and a second sub-pixel among the plurality of sub-pixels varies depending on an arrangement position of the pixel in a row direction and/or a column direction of the matrix.

A liquid crystal display apparatus according to one embodiment of the present invention includes a liquid crystal layer and a plurality of electrode pairs for applying a voltage to the liquid crystal layer. Pixels, each of which has a plurality of sub-pixels, each of which is defined by including an electrode pair of a sub-pixel electrode and a counter electrode facing each other through the liquid crystal layer, are arranged in a matrix shape. A brightness difference or a luminance difference between at least a first sub-pixel and a second sub-pixel among the plurality of sub-pixels varies depending on an arrangement position of the pixel in a row direction and/or a column direction of the matrix.

In the liquid crystal display apparatus according to one embodiment of the present invention, the voltage difference, the brightness difference or the luminance difference becomes larger as the arrangement position of the pixel is more spaced apart from a central portion in the row direction and/or the column direction of the matrix.

The liquid crystal display apparatus according to one embodiment of the present invention further includes a liquid crystal panel which includes the liquid crystal layer and the electrode pairs, a display screen of the liquid crystal being curved forward. The voltage difference, the brightness difference or the luminance difference varies depending on a curvature of the display screen of the liquid crystal panel.

In the liquid crystal display apparatus according to one embodiment of the present invention, the voltage difference, the brightness difference or the luminance difference varies depending on a distance from a central portion of the display screen of the liquid crystal panel to a position spaced apart therefrom forward in a normal direction.

In the liquid crystal display apparatus according to one embodiment of the present invention, a display screen of the liquid crystal panel is curved convexly forward. The voltage difference, the brightness difference or the luminance difference becomes larger as the curvature increases or as the distance is shorter.

In the liquid crystal display apparatus according to one embodiment of the present invention, the second sub-pixel is defined by including an electrode pair of a discharge capacitor electrode and a discharge capacitor counter electrode connected to a prescribed potential, the discharge capacitor electrode and the discharge capacitor counter electrode facing each other through the insulation layer. The liquid crystal display apparatus further includes: a first switching element and a second switching element for applying a data signal to the sub-pixel electrodes included in the first sub-pixel and the second sub-pixel; a third switching element connected between the sub-pixel electrode of the second sub-pixel and the discharge capacitor electrode; and a scanning signal line for applying a scanning signal to control electrodes of the first switching element and the second switching element. A signal delayed by a prescribed time from the scanning signal is applied to the control electrode of the third switching element.

In the liquid crystal display apparatus according to one embodiment of the present invention, regarding the second sub-pixel, a magnitude of a discharge capacity formed by the discharge capacitor electrode and the discharge capacitor counter electrode varies depending on the arrangement position of the pixel.

In the liquid crystal display apparatus according to one embodiment of the present invention, each of the first sub-pixel and the second sub-pixel is defined by including an electrode pair of an auxiliary capacitor electrode and an auxiliary capacitor counter electrode connected to a prescribed potential, the auxiliary capacitor electrode and the auxiliary capacitor counter electrode facing each other through an insulation layer. The sub-pixel electrode and the auxiliary capacitor electrode are electrically connected with each other in each of the first sub-pixel and the second sub-pixel. Regarding the second sub-pixel, a ratio of the magnitude of the discharge capacity to a sum of the magnitude of the discharge capacity, a magnitude of a liquid crystal capacitance and a magnitude of an auxiliary capacitance varies depending on the arrangement position of the pixel, the liquid crystal capacitance being formed by the sub-pixel electrode and the counter electrode, the auxiliary capacitance being formed by the auxiliary capacitor electrode and the auxiliary capacitor counter electrode.

In the liquid crystal display apparatus according to one embodiment of the present invention, the control electrode of the third switching element is connected to the scanning signal line spaced apart in the row direction of the matrix.

The liquid crystal display apparatus according to one embodiment of the present invention further includes: a discharge signal line connected to the control electrode of the third switching element; and a discharge signal line driving circuit configured to apply a signal delayed by a prescribed time from the scanning signal to the discharge signal line. A signal width of the signal applied by the discharge signal line driving circuit varies depending on the arrangement position of the pixel.

A method, according to one embodiment of the present invention, for driving a liquid crystal display apparatus including a liquid crystal layer and a plurality of electrode pairs for applying a voltage to the liquid crystal layer, pixels, each of which has a plurality of sub-pixels, each of which is defined by including an electrode pair of a sub-pixel electrode and a counter electrode facing each other through the liquid crystal layer, being arranged in a matrix shape, includes varying a voltage difference between the voltages applied to the liquid crystal layer through the electrode pair included in each of at least a first sub-pixel and a second sub-pixel among the plurality of sub-pixels, depending on an arrangement position of the pixel in a row direction and/or a column direction of the matrix.

A method, according to one embodiment of the present invention, for driving a liquid crystal display apparatus including a liquid crystal layer and a plurality of electrode pairs for applying a voltage to the liquid crystal layer, pixels, each of which has a plurality of sub-pixels, each of which is defined by including an electrode pair of a sub-pixel electrode and a counter electrode facing each other through the liquid crystal layer, being arranged in a matrix shape, includes varying a brightness difference or a luminance difference between at least a first sub-pixel and a second sub-pixel among the plurality of sub-pixels, depending on an arrangement position of the pixel in a row direction and/or a column direction of the matrix.

According to the embodiment of the present invention, each of the pixels arranged in a matrix shape has the plurality of sub-pixels, each of which is defined by including the electrode pair of the sub-pixel electrode and the counter electrode facing each other through the liquid crystal layer. Regarding each of at least the first sub-pixel and the second sub-pixel included in the pixel, the voltage difference between the voltages applied to the liquid crystal layer through the electrode pair varies depending on the arrangement position of the pixel in the row direction and/or the column direction of the matrix.

Thereby, the voltage difference between the voltages applied to the liquid crystal layer through at least the first sub-pixel and the second sub-pixel is changed depending on the arrangement position of the pixel in the matrix. Therefore, a degree of improvement in visual angle dependency of the gamma characteristics is changed depending on an observation object position on the display screen viewed from the viewer.

According to the embodiment of the present invention, each of the pixels arranged in a matrix shape has the plurality of sub-pixels, each of which is defined by including the electrode pair of the sub-pixel electrode and the counter electrode facing each other through the liquid crystal layer. Regarding each of at least the first sub-pixel and the second sub-pixel included in the pixel, the brightness difference or the luminance difference varies depending on the arrangement position of the pixel in the row direction and/or the column direction of the matrix.

Accordingly, the brightness difference or the luminance difference between at least the first sub-pixel and the second sub-pixel is changed depending on the arrangement position of the pixel in the matrix. Therefore, the degree of improvement in the visual angle dependency of the gamma characteristics is changed depending on the observation object position on the display screen viewed from the viewer.

According to the embodiment of the present invention, the voltage difference between the voltages applied to the liquid crystal layer through at least the first sub-pixel and the second sub-pixel, or the brightness difference or the luminance difference between at least the first sub-pixel and second sub-pixel becomes larger, as the arrangement position of the pixel is more spaced apart from the central portion in the row direction and/or the column direction of the matrix.

Thereby, when the viewer observes the display screen from the front in the central portion of the display screen, the degree of improvement in the visual angle dependency of the gamma characteristics is higher, as the observation object position on the display screen viewed from the viewer in the horizontal direction and/or the vertical direction is more spaced apart from the central portion of the screen.

According to the embodiment of the present invention, the voltage difference between the voltages applied to the liquid crystal layer through at least the first sub-pixel and the second sub-pixel, or the brightness difference or the luminance difference between at least the first sub-pixel and second sub-pixel varies depending on the curvature of the display screen of the liquid crystal panel.

Thereby, the degree of improvement in the visual angle dependency of the gamma characteristics is changed, so as to compensate for a change in a degree of influence in the visual angle dependency of the gamma characteristics depending on the curvature of the display screen.

According to the embodiment of the present invention, the voltage difference between the voltages applied to the liquid crystal layer through at least the first sub-pixel and the second sub-pixel, or the brightness difference or the luminance difference between at least the first sub-pixel and second sub-pixel varies depending on the distance from the central portion of the display screen of the liquid crystal panel to the position spaced apart therefrom forward in the normal direction.

Thereby, the degree of improvement in the visual angle dependency of the gamma characteristics is changed, so as to compensate for a change in a degree of influence in the visual angle dependency of the gamma characteristics depending on the viewing distance with respect to the display screen.

According to the embodiment of the present invention, the voltage difference between the voltages applied to the liquid crystal layer through at least the first sub-pixel and the second sub-pixel, or the brightness difference or the luminance difference between at least the first sub-pixel and second sub-pixel becomes larger as the curvature of the display screen of the liquid crystal panel curved convexly forward increases or as the above-described viewing distance is shorter.

Thereby, the degree of improvement in the visual angle dependency of the gamma characteristics is changed to a large/small value, so as to compensate for that the degree of influence in the visual angle dependency of the gamma characteristics is changed to a large/small value depending on the large/small curvature of the display screen, or depending on the short/long of the viewing distance with respect to the display screen.

According to the embodiment of the present invention, the data signal is applied to the sub-pixel electrodes included in each of the first sub-pixel and the second sub-pixel through the first switching element and the second switching element. The scanning signal is applied from the scanning signal line to the respective control electrodes of the first switching element and the second switching element. The sub-pixel electrode of the second sub-pixel is connected with the discharge capacitor electrode through the third switching element. The electrode pair of the discharge capacitor electrode and the discharge capacitor counter electrode is included in the second sub-pixel. The discharge capacitor counter electrode is connected to the prescribed potential. The signal delayed by the prescribed time from the above-described scanning signal is applied to the control electrode of the third switching element.

Thereby, the sub-pixel electrode of the second sub-pixel and the discharge capacitor electrode are connected with each other at a later time than the time at which the data signal is applied to the respective sub-pixel electrodes, such that the voltage of the sub-pixel electrode of the second sub-pixel is changed. Therefore, there occurs a voltage difference between the voltages applied to the liquid crystal layer through at least the first sub-pixel and second sub-pixel included in the pixel.

According to the embodiment of the present invention, the magnitude of the discharge capacity formed by the discharge capacitor electrode and the discharge capacitor counter electrode included in the second sub-pixel varies depending on the arrangement position of the pixel. Therefore, the voltage of the sub-pixel electrode of the second sub-pixel varies depending on the arrangement position of the pixel so that the voltage difference between the voltages applied to the liquid crystal layer through at least the first sub-pixel and second sub-pixel included in the pixel is changed depending on the arrangement position of the pixel in the matrix.

According to the embodiment of the present invention, the auxiliary capacitor electrode and the auxiliary capacitor counter electrode facing each other through the insulation layer are included in the electrode pair defining each of the first sub-pixel and second sub-pixel included in the pixel. The auxiliary capacitor electrode is electrically connected to the sub-pixel electrode. The auxiliary capacitor counter electrode is connected to the prescribed potential. The magnitude of the discharge capacity is represented by CDC, the magnitude of the liquid crystal capacitance formed by the sub-pixel electrode and the counter electrode is represented by CLC, and the magnitude of the auxiliary capacitance formed by the auxiliary capacitor electrode and the auxiliary capacitor counter electrode is represented by CCS. When the third switching element is conductive, the voltage applied to the liquid crystal layer through the second sub-pixel is changed depending on k=CDC/(CDC+CLC+CCS). Herein, the magnitude of the value of k varies depending on the arrangement position of the pixel in the row direction and/or the column direction of the matrix.

Thereby, the voltage difference between the voltages applied to the liquid crystal layer through at least the first sub-pixel and second sub-pixel included in the pixel is changed depending on the arrangement position of the pixel in the matrix.

According to the embodiment of the present invention, the control electrode of the third switching element is connected to the scanning signal line spaced apart in the row direction of the matrix. Therefore, it is not necessary to generate a particular control signal. Furthermore, in the case where a time which is an integral multiple of one horizontal scanning time elapses from the time when the data signal is applied to the pixel, there occurs a voltage difference between the voltages applied to the liquid crystal layer through at least the first sub-pixel and second sub-pixel included in the pixel.

According to the embodiment of the present invention, the control electrode of the third switching element is connected to the discharge signal line. The discharge signal driving circuit applies a signal, which is delayed by a prescribed time from the scanning signal, to the discharge signal line. A signal width of the applied signal varies depending on the arrangement position of the pixel.

Thereby, the voltage difference between the voltages applied to the liquid crystal layer through at least the first sub-pixel and second sub-pixel included in the pixel is changed depending on the arrangement position of the pixel in the matrix.

According to the embodiment of the present invention, the voltage difference between the voltages applied to the liquid crystal layer through at least the first sub-pixel and second sub-pixel included in the pixel is changed depending on the arrangement position of the pixel in the matrix so that the degree of improvement in the visual angle dependency of the gamma characteristics is changed depending on the observation object position on the display screen viewed from the viewer.

The deterioration tendency of the gamma characteristics and the improvement tendency of the visual angle dependency according to the change of the observation object position are cancelled. Thereby, it possible to effectively suppress a deterioration in the gamma characteristics even when the angle formed by the normal line at the observation object position on the display screen and the visual line of the viewer is relatively large.

The above and further objects and features will move fully be apparent from the following detailed description with accompanying drawings.

BRIEF DESCRIPTION OF THE DRAWINGS

FIG. 3B is a cross-sectional view schematically illustrating the configuration of the liquid crystal panel.

FIG. 7 is a table illustrating a relationship between the position on the display screen and a value of k.

DETAILED DESCRIPTION OF NON-LIMITING EXAMPLE EMBODIMENTS

Hereinafter, the present invention will be described in detail based on the accompanying drawings illustrating embodiments thereof.

Embodiment 1

Figure 1:
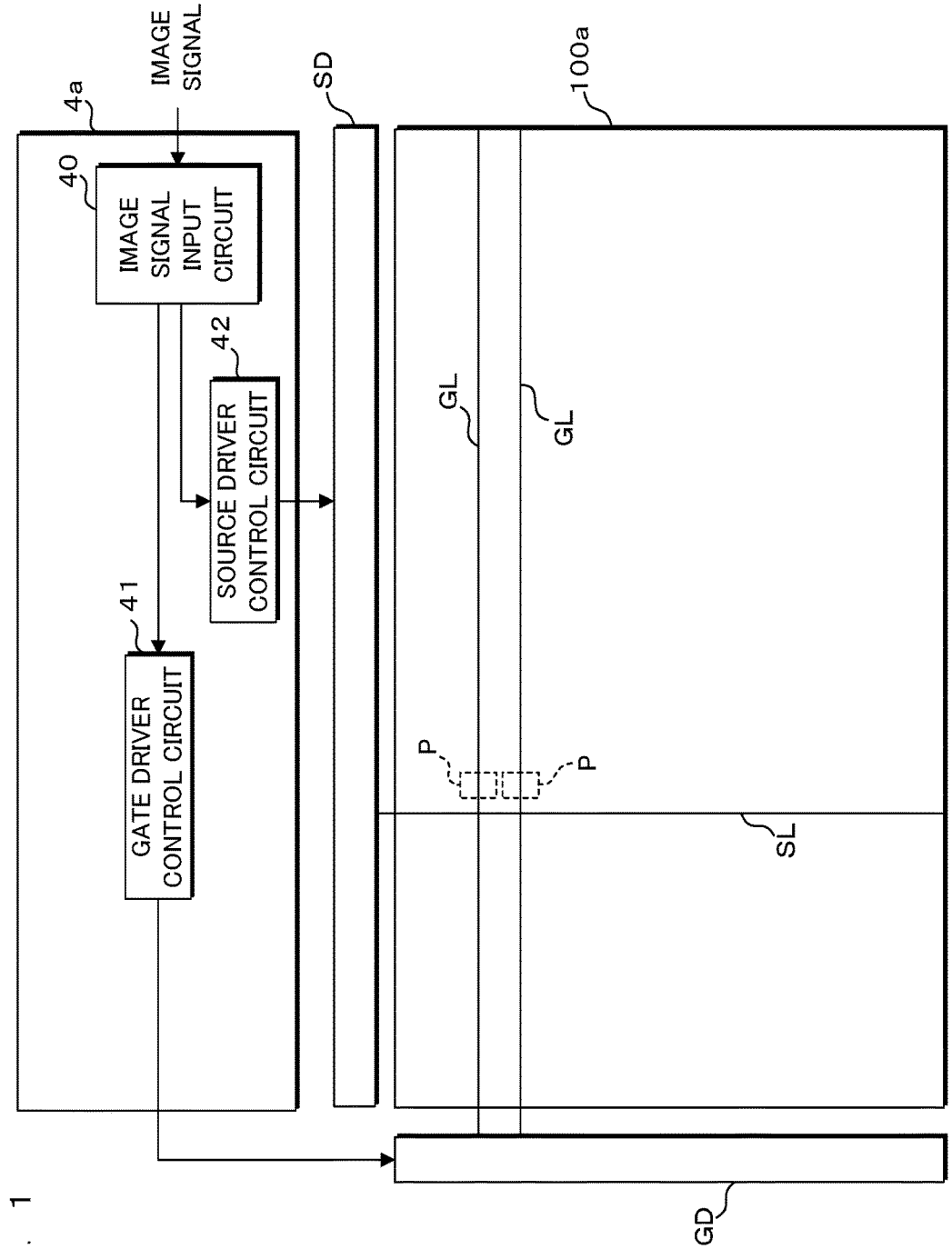
FIG. 1 is a block diagram illustrating a configuration example of a liquid crystal display apparatus according to Embodiment 1 of the present invention.
Figure 2:
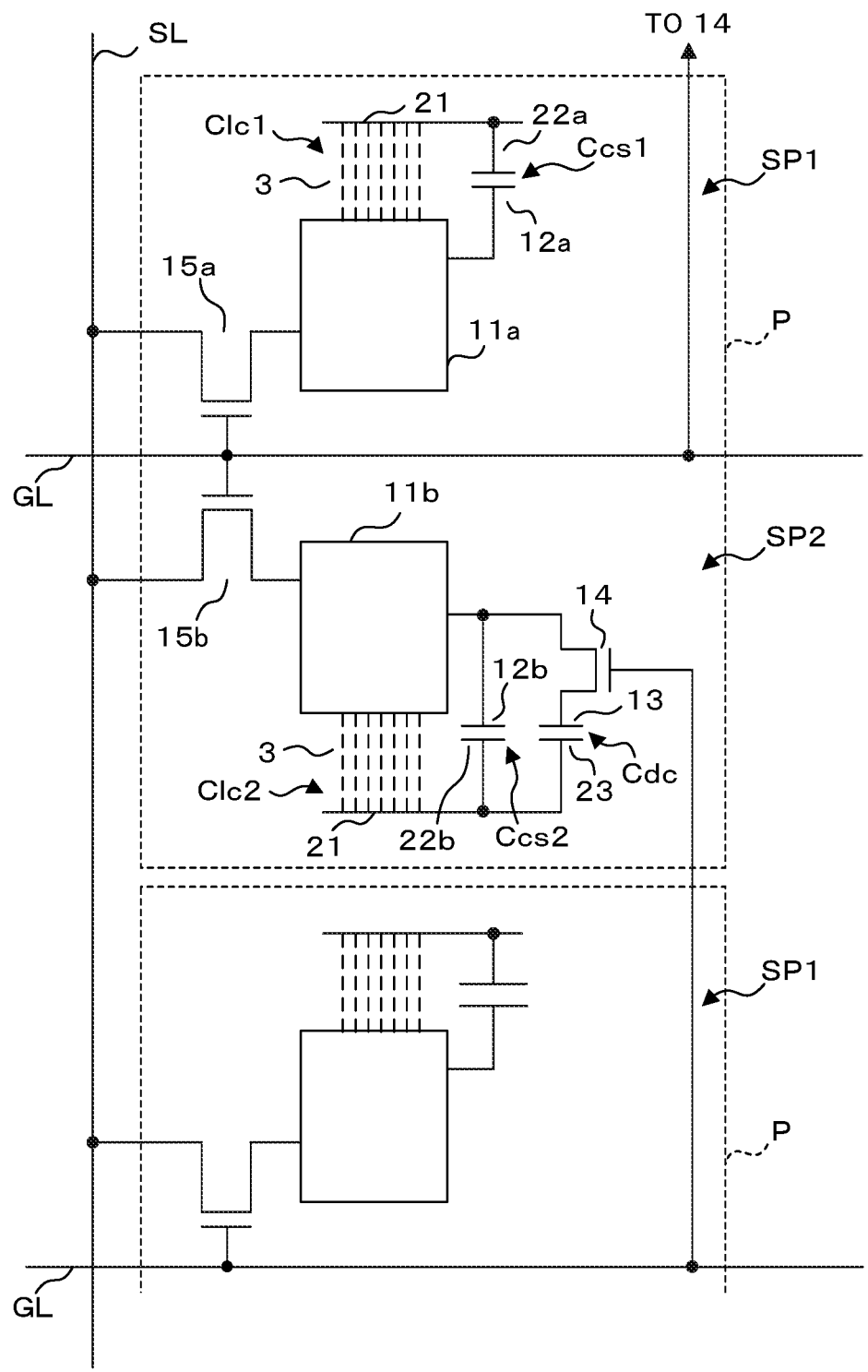
FIG. 2 is an explanatory view schematically illustrating a configuration for defining pixels in a liquid crystal panel according to Embodiment 1.

FIG. 1 is a block diagram illustrating a configuration example of a liquid crystal display apparatus according to Embodiment 1 of the present invention. FIG. 2 is an explanatory view schematically illustrating a configuration for defining pixels P in a liquid crystal panel 100a according to Embodiment 1. The liquid crystal display apparatus illustrated in FIG. 1 includes the liquid crystal panel 100a in which the pixels P are arranged in a matrix shape in a vertical direction of a display screen (hereinafter, briefly referred to as a vertical direction or row direction) and a horizontal direction of the display screen (hereinafter, briefly referred to as a horizontal direction or column direction). Each of the pixels P is defined by including a plurality of electrode pairs to be described below. In the liquid crystal panel 100a, the display screen is curved convexly forward. Regarding the liquid crystal panel 100a, two pixels P continued in the row direction and signal lines related to these two pixels P are mainly illustrated.

In FIG. 2, the pixel P has a sub-pixel SP1 (corresponding to a first sub-pixel) and a sub-pixel SP2 (corresponding to a second sub-pixel) which are disposed continuously in the vertical direction of the display screen of the liquid crystal panel 100a. The sub-pixel SP1 is defined by including: an electrode pair of a sub-pixel electrode 11a and a counter electrode 21 facing each other through a liquid crystal layer 3; and an electrode pair of an auxiliary capacitor electrode 12a and an auxiliary capacitor counter electrode 22a facing each other through an insulation layer (not illustrated). The sub-pixel electrode 11a is connected with one end of a TFT (thin film transistor) 15a (corresponding to a first switching element). The sub-pixel electrode 11a and the auxiliary capacitor electrode 12a are electrically connected with each other. The auxiliary capacitor counter electrode 22a is connected to a potential of the counter electrode 21 (corresponding to a prescribed potential). A liquid crystal capacitor Clc1 is formed by the sub-pixel electrode 11a and the counter electrode 21. An auxiliary capacitor Ccs1 is formed by the auxiliary capacitor electrode 12a and the auxiliary capacitor counter electrode 22a.

The sub-pixel SP2 is defined by including: an electrode pair of a sub-pixel electrode 11b and the counter electrode 21 facing each other through the liquid crystal layer 3; an electrode pair of an auxiliary capacitor electrode 12b and an auxiliary capacitor counter electrode 22b; and an electrode pair of a discharge capacitor electrode 13 and a discharge capacitor counter electrode 23 facing each other through the insulation layer (not illustrated). The sub-pixel electrode 11b is connected with one end of a TFT 15b (corresponding to a second switching element). The sub-pixel electrode 11b and the auxiliary capacitor electrode 12b are electrically connected with each other. The discharge capacitor electrode 13 is connected to the sub-pixel electrode 11b through a TFT 14 (corresponding to a third switching element). The auxiliary capacitor counter electrode 22b and the discharge capacitor counter electrode 23 are connected to the potential of the counter electrode 21. The counter electrode 21 is common for the sub-pixels SP1 and SP2, but it may not be common. A liquid crystal capacitor Clc2 is formed by the sub-pixel electrode 11b and the counter electrode 21. An auxiliary capacitor Ccs2 is formed by the auxiliary capacitor electrode 12b and the auxiliary capacitor counter electrode 22b. A discharge capacitor Cdc is formed by the discharge capacitor electrode 13 and the discharge capacitor counter electrode 23.

A source signal line SL is linearly disposed in the vertical direction on one lateral side of the pixel P in the horizontal direction. The source signal line SL is a signal line for applying a source signal (corresponding to a data signal) to the sub-pixel electrodes 11a and 11b through the TFTs 15a and 15b, respectively. The source signal line SL is connected with the other ends of the TFTs 15a and 15b. Gate electrodes of the TFTs 15a and 15b (corresponding to control electrodes) are connected to a scanning signal line GL which is linearly disposed so as to horizontally cut across a central portion of the pixel P. The gate electrode of the TFT 14 is connected to another scanning signal line GL which is the next line adjacent to the above-described scanning signal line GL in the vertical direction (row direction).

As illustrated in FIG. 1, the liquid crystal display apparatus according to Embodiment 1 further includes a gate driver GD, a source driver SD, and a display control circuit 4a. The gate driver GD applies a scanning signal to the scanning signal lines GL, GL, . . . and GL. The source driver SD applies a source signal to the source signal lines SL, SL . . . and SL. The display control circuit 4a controls display on the liquid crystal panel 100a by using the gate driver GD and the source driver SD.

The display control circuit 4a has an image signal input circuit 40, a gate driver control circuit 41, and a source driver control circuit 42. The image signal input circuit 40 receives an image signal including image data representing an image. The gate driver control circuit 41 and the source driver control circuit 42 control the gate driver GD and the source driver SD respectively based on a clock signal and a synchronization signal separated by the image signal input circuit 40.

The gate driver control circuit 41 and the source driver control circuit 42 generate control signals such as a start signal, a clock signal, and an enable signal which are necessary for periodic operations of the gate driver GD and the source driver SD respectively. The source driver control circuit 42 further outputs digital image data separated by the image signal input circuit 40 to the source driver SD.

The gate driver GD sequentially applies scanning signals to the scanning signal lines GL, GL, . . . and GL at a prescribed time difference within one frame period of the image data. The source driver SD accumulates digital image data (serial data) given from the source driver control circuit 42 for one horizontal scanning period, and generates analog source signals (parallel signals) representing an image for one line. The source driver SD applies the generated source signals to the source signal lines SL, SL . . . and SL in parallel. Herein, the source signals for one line are updated at the above-described prescribed time difference.

The scanning signal applied to one of the scanning signal lines GL, GL, . . . and GL is applied to the gate electrode of the TFT 15a and 15b included in each of the pixels P, P, . . . and P for one line arranged in the column direction. A scanning signal delayed by one horizontal scanning period from the scanning signal applied to the gate electrodes of the TFTs 15a and 15b is applied to the gate electrodes of the TFTs 14 included in each of the above-described pixels P, P, . . . and P for one line. It is noted that a scanning signal delayed by two horizontal scanning periods or more may be applied to the gate electrodes of the TFTs 14 included in each of the above-described pixels P, P, . . . and P for one line. It is preferable that a delay amount of the scanning signal applied to the gate electrode of the TFT 14 is a negligible delay amount with respect to one frame period.

The source signals applied to the source signal lines SL, SL . . . and SL are applied to the sub-pixel electrodes 11a and 11b through the TFTs 15a and 15b, gates of which are connected to a scanning signal line GL in one horizontal scanning period in which the scanning signal is applied to this scanning signal line GL. Furthermore, the source signals are applied to the auxiliary capacitor electrodes 12a and 12b. Thereby, the source signals are written in the liquid crystal capacitors Clc1 and Clc2 and the auxiliary capacitors Ccs1 and Ccs2 formed in the sub-pixels SP1 and SP2. In this manner, the source signals for one line are simultaneously written in the pixels P, P, . . . and P for one line in one horizontal scanning period. The source signals written in the sub-pixels SP1 and SP2 are maintained for one frame period as long as there is no change in a synthetic capacitance of the sub-pixels SP1 and SP2.

Next, an optical configuration of the liquid crystal panel 100a and another liquid crystal panel which may substituted therewith will be described.

Figure 3A:
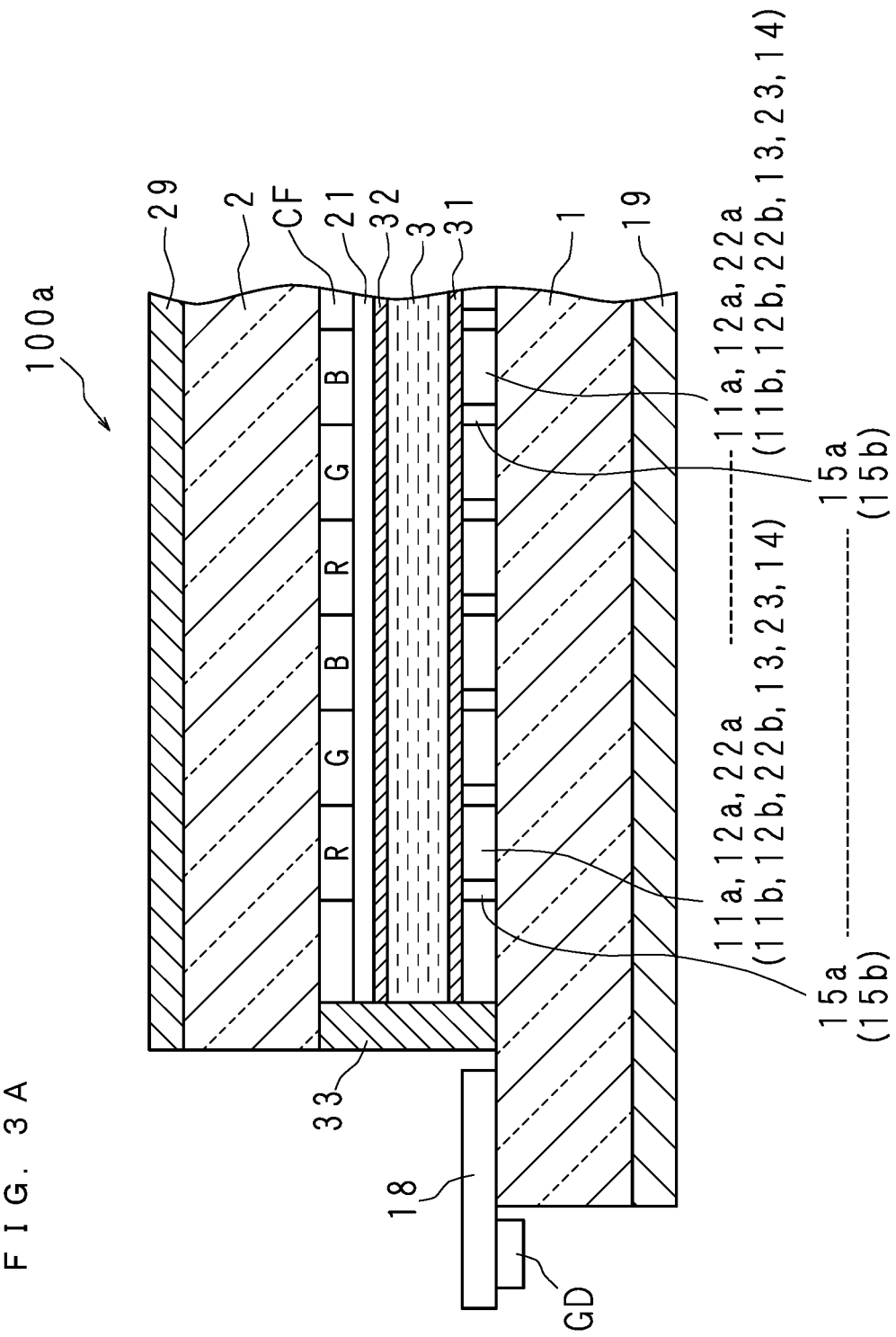
FIG. 3A is a cross-sectional view schematically illustrating a configuration of the liquid crystal panel.

FIG. 3A is a cross-sectional view schematically illustrating a configuration of the liquid crystal panel 100a. FIG. 3B is a cross-sectional view schematically illustrating a configuration of a liquid crystal panel 100x. The most of the configuration of the liquid crystal panel 100x is same as the configuration of the liquid crystal panel 100a. Therefore, most of the configuration will be commonly described. Each of the liquid crystal panels 100a and 100x is configured by installing the liquid crystal layer 3 between a first glass substrate (array substrate) 1 and a second glass substrate 2. A seal material 33 for sealing liquid crystal enclosed in the liquid crystal layer 3 is provided between two surfaces of the first glass substrate 1 and the second glass substrate 2 facing each other along a peripheral edge portion of the second glass substrate 2.

On one surface of the first glass substrate 1, an alignment film 31 is formed on a layer including the sub-pixel electrodes 11a and 11b made of a transparent electrode, the auxiliary capacitor electrodes 12a and 12b, the auxiliary capacitor counter electrodes 22a and 22b, the discharge capacitor electrode 13 and the discharge capacitor counter electrode 23, the TFT 14, and the TFTs 15a and 15b. In particular, in the liquid crystal panel 100x, a color filter CF of three colors of R, G and B corresponding to each pixel P is formed between the alignment film 31 and the layer including the TFTs 15a and 15b and the like. A polarizing plate 19 is attached to the other surface of the first glass substrate 1. A flexible substrate 18 on which the gate driver GD is surface-mounted is attached to one edge portion of the one surface of the first glass substrate 1.

The counter electrode 21 made of a transparent electrode and an alignment film 32 are formed on one surface of the second glass substrate 2 by lamination. In particular, in the liquid crystal panel 100a, a color filter CF is formed between the second glass substrate 2 and the counter electrode 21. A polarizing plate 29 is attached to the other surface of the second glass substrate 2. Polarization directions (polarization planes) of light waves passing through the polarizing plate 19 and the polarizing plate 29 respectively are different from each other by 90 degrees. A backlight (not illustrated) is provided on the other surface side (a side to which the polarizing plate 19 is attached) of the first glass substrate 1.

Substantially, the liquid crystal panels 100a and 100x are different from each other only in terms of the position of the color filter CF. By disposing the color filter CF on the first glass substrate 1 side, it is possible to achieve an effect of preventing a color shift in the case where the display screen is curved.

In the above-described configuration, when no voltage is applied between each of the sub-pixel electrodes 11a and 11b and the counter electrode 21 of the pixel P, the polarization direction of the light transmitting through the pixel P does not change. Therefore, the light which is irradiated from the backlight and is transmitted through the polarizing plate 19 is absorbed by the polarizing plate 29. Meanwhile, when a voltage is applied between each of the sub-pixel electrodes 11a and 11b and the counter electrode 21 of the pixel P, the polarization direction of the light transmitting through the pixel P is changed depending on the magnitude of the voltage. Therefore, the polarization direction of the light which is irradiated from the backlight and is transmitted through the polarizing plate 19 is changed depending on the magnitude of the voltage. The light, polarization direction of which is changed, is transmitted through the polarizing plate 29. A brightness of the image displayed by the pixel P is changed depending on the magnitude of the voltage.

Next, a relationship between voltage signals applied to the source signal line SL and the scanning signal line GL and voltages applied to the liquid crystal capacitors Clc1 and Clc2 will be described.

Figure 4:
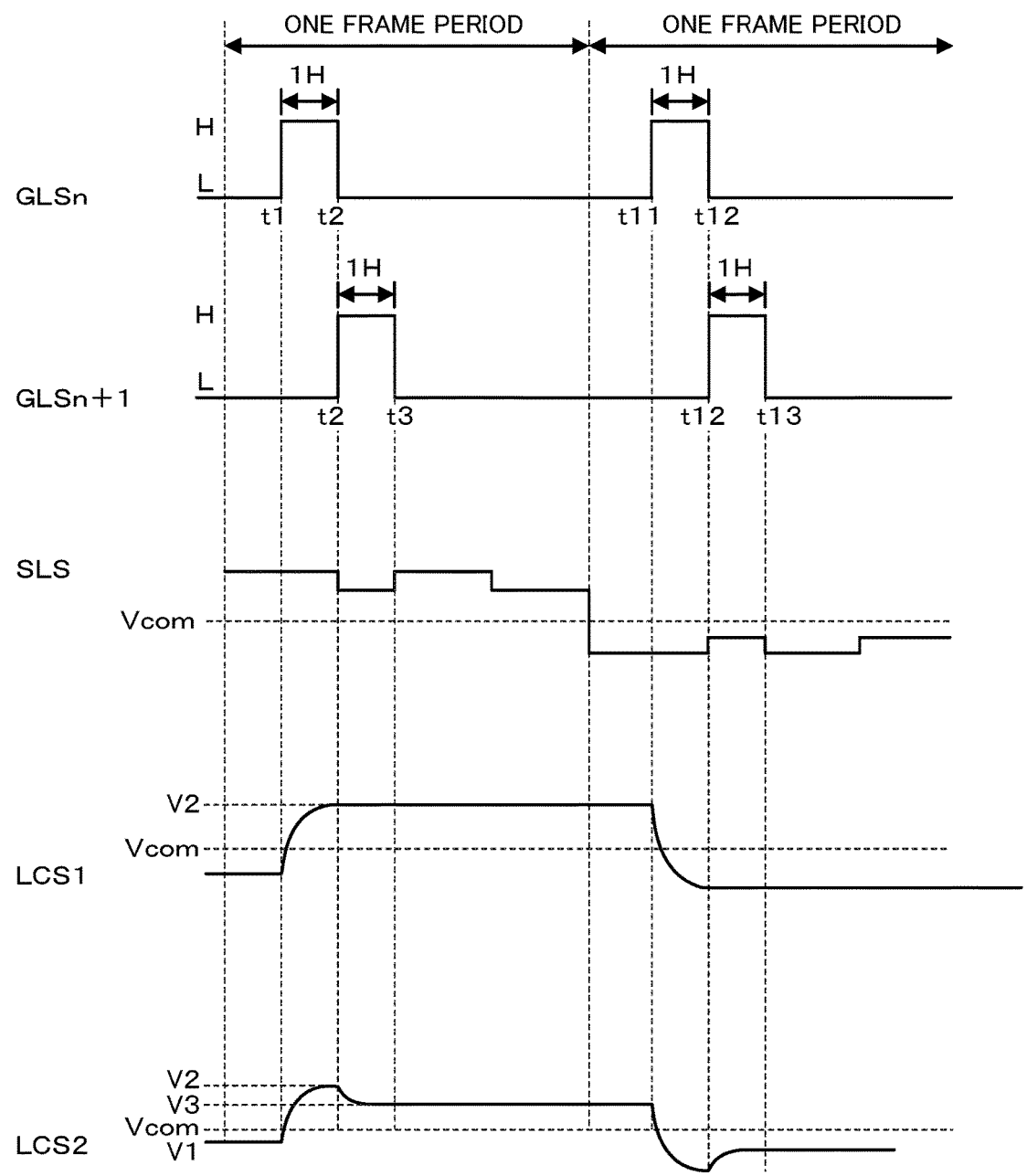
FIG. 4 is a timing chart illustrating a voltage change in signals applied to each signal line and liquid crystal capacitors.

FIG. 4 is a timing chart illustrating a voltage change in signals applied to each signal line and the liquid crystal capacitors Clc1 and Clc2. In five timing diagrams illustrated in FIG. 4, all horizontal axes represent the same time axis and a vertical axis represents signal levels of a signal GLSn, signal GLSn+1, signal SLS, signal LCS1, and signal LCS2 from an upper side of FIG. 4. The signal GLSn, signal GLSn+1, signal SLS, signal LCS1, and signal LCS2 are applied to an n-th scanning signal line GL, n+1-th scanning signal line GL, one source signal line SL, liquid crystal capacitor Clc1, and liquid crystal capacitor Clc2, respectively. The potential of the counter electrode 21 is indicated by Vcom. The voltage of each signal is a potential difference based on Vcom. It is noted that the magnitudes of unit voltages on the vertical axis are not necessarily uniform.

In two frame periods illustrated in FIG. 4, the signal GLSn is at a high (H) level in each of one horizontal scanning period (1H) from time t1 to t2 and one horizontal scanning period from time t11 to t12, and is at a low (L) level in the other periods. The signal GLSn+1 is at an H level in each of one horizontal scanning period from time t2 to t3 and one horizontal scanning period from time t12 to t13, and is at an L level in the other periods. It is noted that a horizontal blanking period is disregarded. An amplitude of the signal SLS is changed in each one horizontal scanning period within one frame period. When the next one frame period is arrived, a polarity of the signal SLS with respect to Vcom is inverted and then the amplitude of the signal SLS is changed. As such, the signal SLS is an analog voltage signal, polarity of which is inverted in each frame period. It is noted that an inversion period of the polarity is not limited to one frame period.

Hereinafter, an example, in which the voltages of the signals LCS1 and LCS2 are changed in time as illustrated in FIG. 4, will be described. When the signal GLSn is set to an H level at time t1 (or t11), the TFTs 15a and 15b illustrated in FIG. 2 are turned on (a conduction state), the signal SLS of the source signal line SL is applied to the sub-pixel electrodes 11a and 11b and the auxiliary capacitor electrodes 12a and 12b. Thereby, the voltages of the signals LCS1 and LCS2 applied to the liquid crystal capacitors Clc1 and Clc2 respectively become the same voltage as that of the signal SLS until the time becomes time t2 (or t12).

Thereafter, when the signal GLSn becomes an L level at time t2 (or t12), the TFTs 15a and 15b are turned off (a non-conduction state). At this time, due to the influence of a so-called pull-in phenomenon (feed-through), the voltages of the signals LCS1 and LCS2 applied to each of the liquid crystal capacitors Clc1 and Clc2 are slightly decreased. Herein, this decrease in the voltages is not illustrated in FIG. 4. The voltage of the signal LCS1 is maintained until the next frame period is arrived.

Meanwhile, when the signal GLSn+1 becomes an H level at time t2 (or t12), the TFT 14 is turned on and the discharge capacitor Cdc is connected to the liquid crystal capacitor Clc2 and the auxiliary capacitor Ccs2 in parallel. Therefore, until the time becomes time t3 (or t13), a positive charge (or a negative charge) moves from the liquid crystal capacitor Clc2 and the auxiliary capacitor Ccs2 to the discharge capacitor Cdc so that the voltage of the signal LCS2 is decreased (or increased). Electrostatic capacitances of the liquid crystal capacitor Clc2, the auxiliary capacitor Ccs2, and the discharge capacitor Cdc are represented by CLC, CCS and CDC, respectively. Further, the voltage of the signal LCS2 at time t1 is represented by V1, and the voltage of the signals LCS1 and LCS2 at time t2 is represented by V2. The voltage V3 of the signal LCS2 at time t3 is represented by Equation (2) obtained by modifying Equation (1) below derived from the charge conservation law.

$$V3 \times (CDC + CLC + CCS) = V1 \times CDC + V2 \times (CLC + CCS) \quad (1)$$

$$V3 = \{V1 \times CDC + V2 \times (CLC + CCS)\}/(CDC + CLC + CCS) \quad (2)$$

Herein, when a state, in which a waveform of the signal SLS illustrated in FIG. 4 is substantially symmetrical up and down about Vcom, is continued from the next frame and thereafter, the signal LCS1 becomes a substantially symmetrical waveform up and down about Vcom. In this case, also regarding the signal LCS2, the change of the voltage, an absolute value of which is substantially same, is repeated for each one frame from time t2, such that the absolute value of voltage V3 converges to the same value as the absolute value of voltage V1. Therefore, if by setting V1=−V3 in Expression (2) and further setting k=CDC/(CDC+CLC+CCS), Expression (2) is modified as Expression (3) below.

$$V3 = V2(1-k)/(1+k) \quad (3)$$

Herein, 0<k<1

From Equation (3), the voltage V3 has a smaller absolute value than that of the voltage V2, and the absolute value becomes smaller with increasing the value of k.

From the above description, it can be seen that the voltage difference between the effective voltages of the sub-pixels SP1 and SP2 is changed to a large/small value by changing the value of k to a large/small value. For example, in an order to change the value of k to a large/small value, it may be preferable to change the CDC to a large/small value. Next, the cases and manner in which the voltage difference between the above-described effective voltages needs to be changed will be described.

Figure 5A:
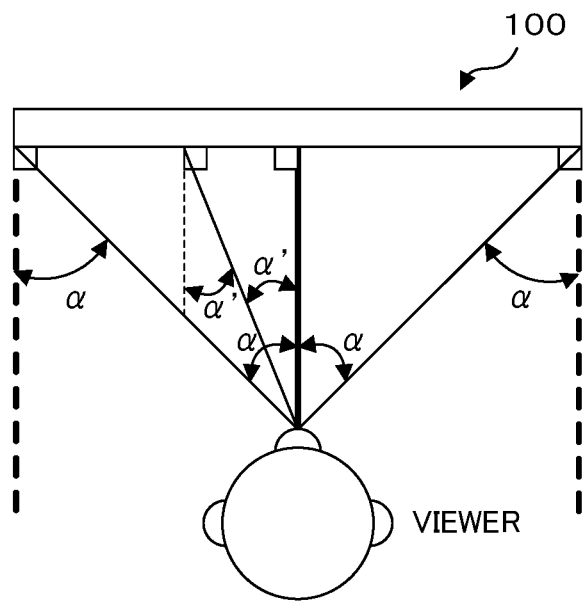
FIG. 5A is an explanatory view for explaining an angle formed by a visual line with respect to a planar liquid crystal panel and a normal line of a display screen.
Figure 5B:
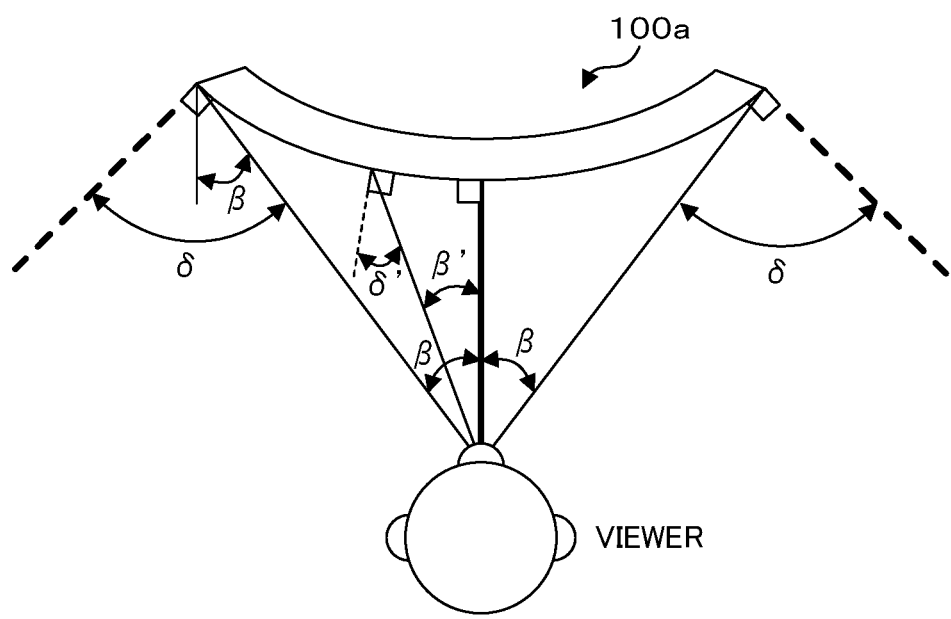
FIG. 5B is an explanatory view for explaining an angle formed by the visual line with respect to a liquid crystal panel curved convexly forward and the normal line of a display screen.

FIG. 5A is an explanatory view for explaining an angle formed by a visual line with respect to the planar liquid crystal panel 100 and a normal line of the display screen. FIG. 5B is an explanatory view for explaining an angle formed by the visual line with respect to the liquid crystal panel 100a curved convexly forward and the normal line of the display screen. The normal lines at a central portion and edge portions of the display screen are represented by a thick solid line and broken lines, respectively. Visual angles at which a viewer in each of FIGS. 5A and 5B see both ends of the display screen are represented by 2α and 2ß. For the sake of simplicity, regarding the liquid crystal panels 100 and 100a having the same lateral width along the display screen, a case where the viewer faces and observes the display screen from the front in the central portion of the display screen, will be described in FIGS. 5A and 5B.

In FIG. 5A, when an angle formed by the visual line in a case where the viewer observes the central portion of the display screen and the visual line in a case where the viewer observes a position spaced apart from the central portion is increased from α' to α, an angle formed by the normal line and the visual line at an observation object position on the display screen is also increased from α' to α.

Meanwhile, in FIG. 5B, when the angle formed by the visual line in a case where the viewer observes the central portion of the display screen and the visual line in a case where the viewer observes the position spaced apart from the central portion is increased from ß' to ß, the angle formed by the normal line and the visual line at an observation object position on the display screen is increased from δ' to δ. Herein, an increasing rate from δ' to δ is increased depending on a curvature of the display screen of the liquid crystal panel 100a so that it is self-evident that the increasing rate from δ' to δ is higher than the increasing rate from ß' to ß. From the above description, it can be seen that a problem of a visual angle dependency of the gamma characteristics is more apparent as the observation object position on the display screen moves from the central portion to the end portion of the display screen in the case of FIG. 5B.

In a liquid crystal display apparatus having a plurality of sub-pixels for each pixel, it can be seen that the visual angle dependency of the gamma characteristics is improved by changing the effective voltages of a plurality of sub-pixels to vary a brightness difference or a luminance difference between sub-pixels. In the present Embodiment 1, the voltage difference between the effective voltages of the sub-pixels SP1 and SP2 is set to be decreased at the central portion of the display screen and to be increased at the end portions of the display screen. The voltage difference between the effective voltages is smoothly changed depending on the change in the position of the pixel P between the central portion and the end portion. Thereby, the brightness difference or the luminance difference between the sub-pixels SP1 and SP2 is smoothly changed.

Figure 6:
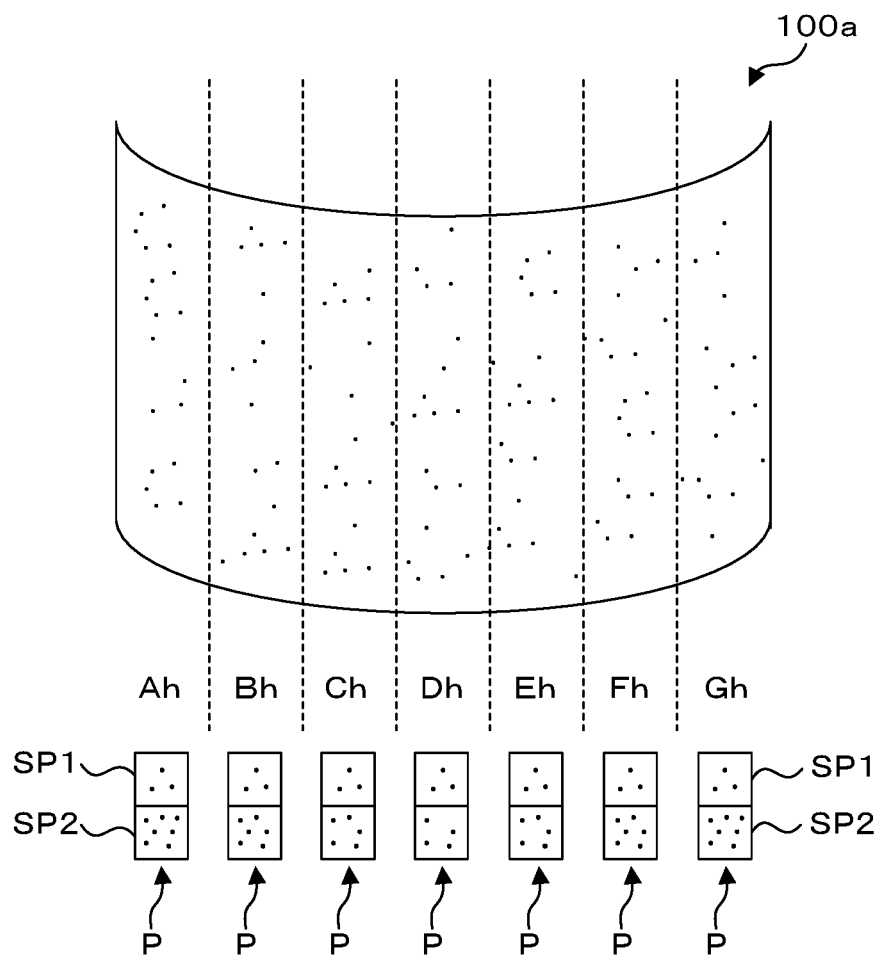
FIG. 6 is an explanatory view illustrating an example of changing a voltage difference between effective voltages of sub-pixels depending on a horizontal position on the display screen.

FIG. 6 is an explanatory view illustrating an example of changing the voltage difference between the effective voltages of the sub-pixels SP1 and SP2 depending on the horizontal position on the display screen. In the Embodiment 1, as illustrated in the upper portion of FIG. 6, the display screen of the liquid crystal panel 100a is divided into seven longitudinally long virtual regions from a region Ah to a region Gh in the horizontal direction. The regions Ah and Gh correspond to left and right edge portions of the display screen respectively. The region Dh corresponds to the central portion of the display screen. The number of divisions of the display screen is not limited to seven from Ah to Gh.

Herein, the voltage difference between the effective voltages of the sub-pixels SP1 and SP2 included in the pixel P of each region is changed, so that this voltage difference is maximized in the regions Ah and Gh and is minimized in the region Dh. Furthermore, the above-described voltage difference between the effective voltages is changed so that this voltage difference is gradually decreased in an order from the region Ah to the regions Bh, Ch and Dh, and an order from the region Gh to the regions Fh, Eh and Dh. Specifically, the above-described value of k is adjusted so that the value of k is maximized in the regions Ah and Gh, and is minimized in the region Dh. The magnitude of the CDC may be adjusted so that the magnitude of the CDC is maximized in the regions Ah and Gh, and is minimized in the region Dh.

As described above, by changing the voltage difference between the effective voltages of the sub-pixels SP1 and SP2, for example, as illustrated in a lower portion of FIG. 6, the sub-pixel SP2 in the region Dh is displayed with lower brightness or luminance than that of the sub-pixel SP1, and the brightness or luminance of the sub-pixel SP2 is gradually decreased in an order from the region Dh to the regions Ch, Bh and Ah, and an order from the region Dh to the regions Eh, Fh and Gh. Thereby, as illustrated in the upper portion of FIG. 6, the brightness or luminance of the pixel P observed from the viewer is uniformly distributed across the whole of the display screen of the liquid crystal panel 100a. Further, when a degree of curvature of the display screen of the liquid crystal panel 100a is not uniform, correction may be performed in such a manner that the voltage difference between the effective voltages of the sub-pixels SP1 and SP2 becomes further larger with increasing the degree of curving of the region.

Hereinafter, simulation results when the value of k used in the above-described Equation (3) is changed depending on the position of the pixel P on the display screen will be described.

Figure 8:
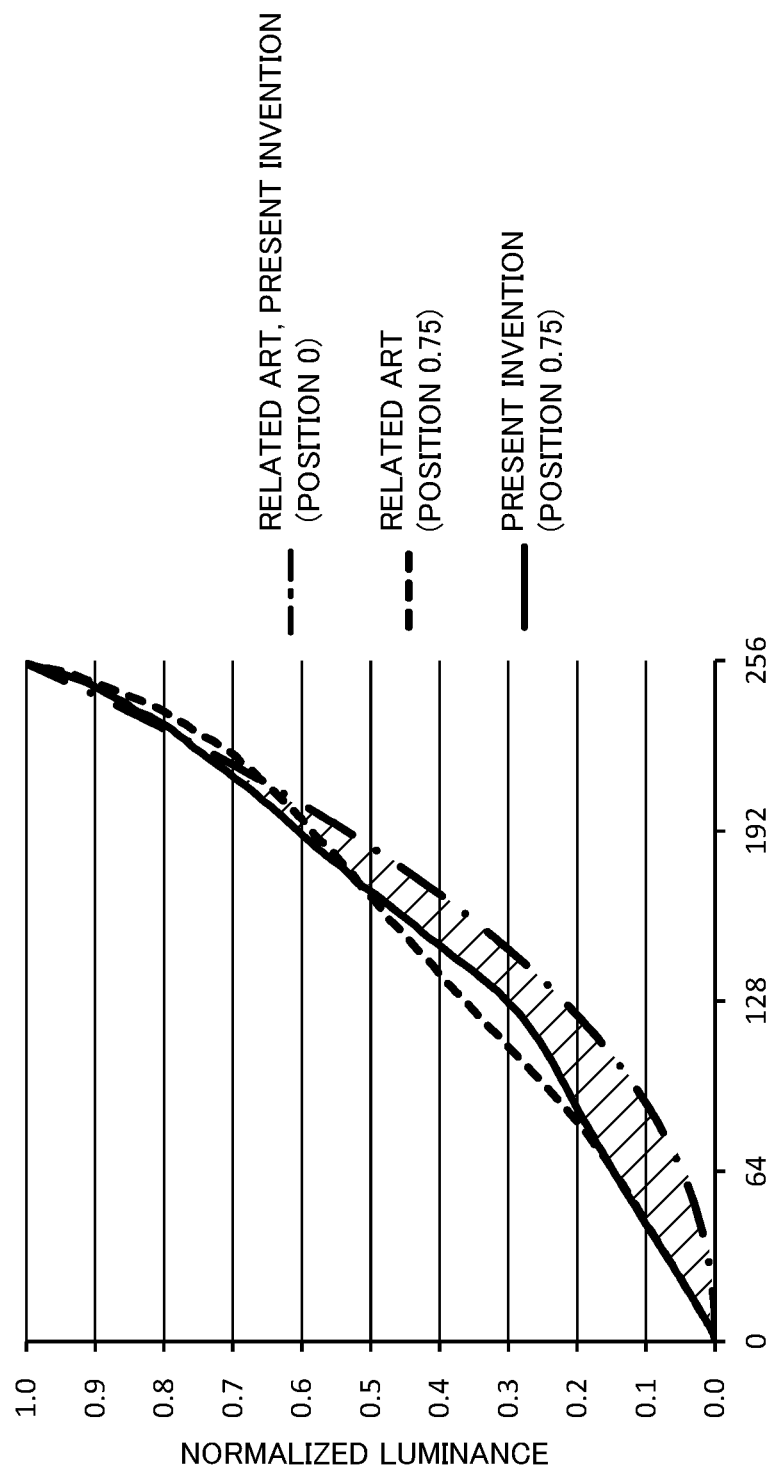
FIG. 8 is a graph illustrating a relationship between gradation and luminance.
Figure 9:
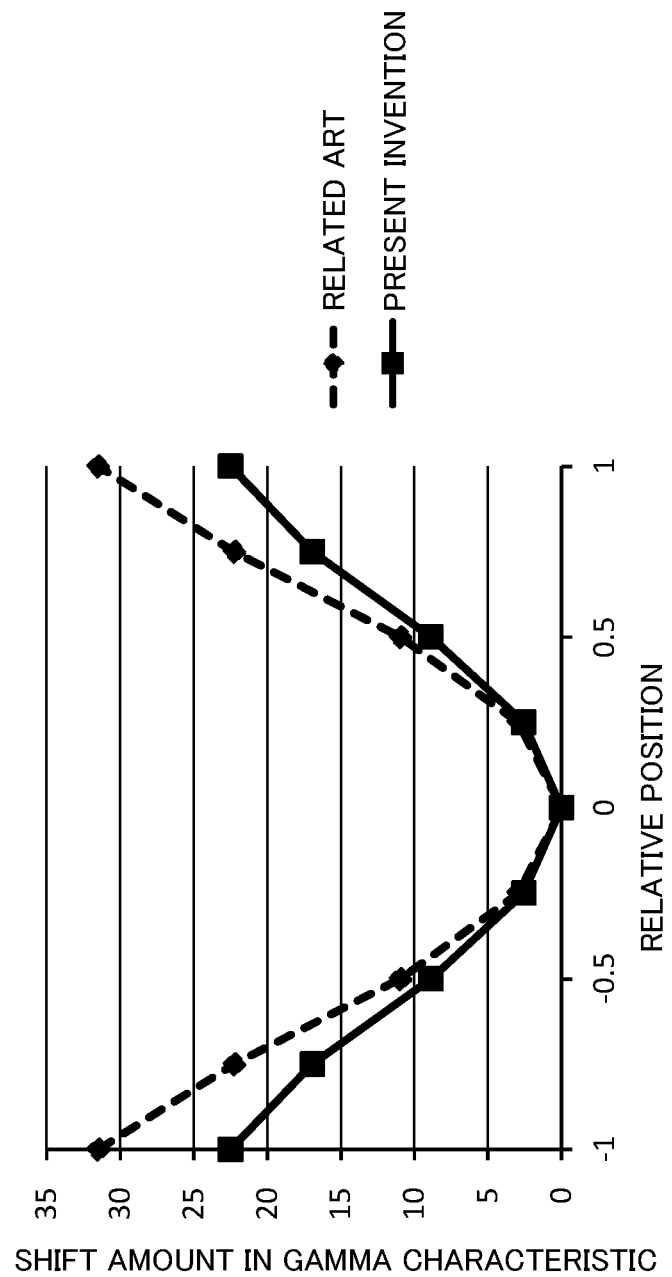
FIG. 9 is a graph illustrating a relationship between the position on the display screen and a shift amount in gamma characteristics.

FIG. 7 is a table illustrating a relationship between the position on the display screen and the value of k. FIG. 8 is a graph illustrating a relationship between the gradation and the luminance. FIG. 9 is a graph illustrating a relationship between the position on the display screen and a shift amount in the gamma characteristics.

The liquid crystal panel used in the simulation in FIGS. 7, 8 and 9 is a 60-inch type, and a dimension of the planar liquid crystal panel before being bent is 748.44 mm in length and 1330.56 mm in width. This planar liquid crystal panel is curved in a cylindrical shape along the longitudinal direction (lateral direction=horizontal direction) so that it has a curvature radius of 800 mm, and the display screen is convex forward. The curved liquid crystal panel is considered to the liquid crystal panel 100a. The simulation was performed for the case where the viewer faces and observes the display screen from the front in the central portion of the display screen of the liquid crystal panel 100a. Herein, a viewing distance from the viewer to the central portion of the display screen is set to be 2245.32 mm. In this case, the visual angle at which the viewer sees both ends of the display screen is about 47 degrees.

In FIG. 7, values of the positions of a left end portion, the central portion, and a right end portion of the display screen in the horizontal direction are set to be −1.00, 0.00 and 1.00 respectively. Values of the positions between positions of the left portion and the center portion and between positions of the center portion and the right portion are equally allocated based on the distance along the display screen. Relative positions on the display screen are the allocated values. Herein, the display screen of the liquid crystal panel 100a is divided into nine longitudinally long virtual regions from a region Ah to a region Ih in the horizontal direction. The regions Ah and Ih correspond to the left and right edge portions of the display screen respectively. The region Eh corresponds to the central portion of the display screen. Therefore, the positions in which the values are −1.00, 0.00 and 1.00 correspond to the left end portion corresponding to the region Ah, the central portion corresponding to the region Eh and the right end portion corresponding to the region Ih respectively. In addition, the positions in which the values are −0.75, −0.50 and −0.25 correspond to the regions Bh, Ch and Dh respectively. The positions in which values are 0.25, 0.50 and 0.75 correspond to the regions Fh, Gh and Hh respectively.

The values of k in the regions Ah, Bh, Ch, Dh, Eh, Fh, Gh, Hh and Ih are 0.32, 0.28, 0.22, 0.14, 0.11, 0.14, 0.22, 0.28 and 0.32 respectively. The electrostatic capacitance CLC of the liquid crystal capacitors Clc1 and Clc2 is changed depending on the pixel voltages applied to the sub-pixels SP1 and SP2 (that is, the voltages applied to the liquid crystal capacitors Clc1 and Clc2). When the electrostatic capacitance CLC is changed, the values of k are also changed. Therefore, herein, the value of k when the effective voltage applied to the liquid crystal capacitors Clc1 and Clc2 is 3V will be exemplified.

It is noted that term 'related art' in FIGS. 8 and 9 illustrates a case of a liquid crystal panel in which the value of k is fixed to 0.11.

In FIG. 8, a horizontal axis of the graph represents a gradation based on the digital image data separated by the image signal input circuit 40. A vertical axis of the graph represents a luminance obtained by normalizing the maximum value to 1. Each curve in the graph is the gamma characteristics indicating the luminance observed at each relative position on the display screen with respect to the gradation of an input signal. A one-dot chain line shows a characteristic of the liquid crystal panels 100a according to the related art and the present invention at a relative position having a value of 0.00. This characteristic is a standard characteristic that a γ value is 2.2. Further, a broken line and a solid line show characteristics of the liquid crystal panels 100a according to the related art and the present invention relatively at a relative position having a value of 0.75. In the liquid crystal panel 100a according to the present invention, the characteristic is clearly close to the characteristic that the γ value is 2.2 as compared with the conventional liquid crystal panel.

Herein, a shift amount between the gamma characteristic at the relative position having the value of 0.00 and the gamma characteristic at the relative positions other than the value of 0.00 is represented by an index proportional to an area of a region surrounded by the characteristic curve at the relative positions of these gamma characteristics. For example, regarding the liquid crystal panel 100a according to the present invention, the shift amount in the gamma characteristic at the relative position having a value of 0.75 corresponds to an area of a region hatched with oblique lines in FIG. 8.

In FIG. 9, a horizontal axis of the graph represents the relative position on the display screen. A vertical axis of the graph represents the shift amount in the gamma characteristics. A broken line and a solid line in the graph show the shift amount for the liquid crystal panels 100a according to the related art and the present invention relatively. In the conventional liquid crystal panel, the shift amount of the gamma characteristics at the relative positions having values of −1.00 and 1.00 is increased to about 32. On the other hand, in the liquid crystal panel 100a according to the present invention, the shift amount of the gamma characteristics at the same relative positions falls within about 23. Also regarding the other relative positions, the liquid crystal panel 100a according to the present invention has a smaller shift amount than the conventional liquid crystal panel.

Furthermore, in the present Embodiment 1, the case where the display screen of the liquid crystal panel 100a is curved convexly forward, has been described. A shape of the display screen is not limited thereto. Even when the display screen is concavely curved forward, or even when the display screen is planar like the liquid crystal panel 100 illustrated in FIG. 5A, by dividing the display screen into a plurality of regions, and changing the voltage difference between the effective voltages of the sub-pixels SP1 and SP2 included in the pixel P of each region, it is possible to optimize the visual angle dependency of the gamma characteristics for each region. This is particularly effective when a longitudinal dimension of the liquid crystal panel 100 is relatively large, or when a distance between the viewer and the display screen is relatively short.

In addition, in Embodiment 1, the display screen of the liquid crystal panel 100a is divided into a plurality of longitudinally long virtual regions in the horizontal direction. However, for example, when the display screen is longitudinally long, the display screen may be divided into a plurality of laterally long virtual regions in the vertical direction. In this case, the voltage difference between the effective voltages of the sub-pixels SP1 and SP2 may be changed depending on the arrangement position of the pixel P in the vertical direction of the display screen.

Further, in Embodiment 1, when the viewer faces and observes the display screen from the front in the central portion of the display screen, the voltage difference between the effective voltages of the sub-pixels SP1 and SP2 included in the pixel P is changed so that this voltage difference is decreased at the central portion of the display screen, and is increased at the edge portions. Adjustment of the voltage difference between the effective voltages is not limited thereto. For example, when the viewer observes the display screen at a position deviated from the position illustrated in FIG. 5B in the horizontal direction or in the vertical direction, the above-described voltage difference between the effective voltages may be changed from small to large about the position on the display screen, in which the viewer faces. Briefly, the above-described voltage difference between the effective voltages may be changed depending on the arrangement position of the pixel P in the horizontal direction and/or the vertical direction of the display screen.

Further, in Embodiment 1, the example, in which the pixel P has two sub-pixels SP1 and SP2, has been described. However, the number of the sub-pixels is not limited to two, and may be three or more. For example, when one pixel has three sub-pixels, the voltage difference between the effective voltages of an arbitrary two sub-pixels may be changed as described above.

As described above, according to Embodiment 1, each of the pixels P arranged in a matrix shape has sub-pixels SP1 and SP2 defined by including the electrode pairs of each of sub-pixel electrodes 11a and 11b facing each other through the liquid crystal layer 3, and the counter electrode 21. Then, regarding at least the sub-pixels SP1 and SP2 included in the pixel P, the voltage difference between the voltages applied to the liquid crystal layer 3 through electrode pairs, or the brightness difference or the luminance difference between the respective sub-pixels varies depending on the arrangement position of the pixel P in the row direction and/or the column direction of the matrix.

Thereby, the voltage difference between the voltages applied to the liquid crystal layer 3 through at least the sub-pixels SP1 and SP2, or the brightness difference or the luminance difference between at least the sub-pixels SP1 and SP2 is changed depending on the arrangement position of the pixel P in the matrix. Therefore, the degree of improvement in the visual angle dependency of the gamma characteristics is changed depending on the observation object position on the display screen viewed from the viewer.

Therefore, even when the angle formed by the normal line at the observation object position on the display screen and the visual line of the viewer is relatively large, a deterioration in the gamma characteristics can be effectively suppressed.

Further, according to Embodiment 1, the voltage difference between the voltages applied to the liquid crystal layer 3 through at least the sub-pixels SP1 and SP2, or the brightness difference or the luminance difference between at least the sub-pixels SP1 and SP2 becomes larger, as the arrangement position of the pixel P arranged in a matrix shape is more spaced apart from the central portion in the row direction and/or the column direction of the matrix.

Accordingly, when the viewer observes the display screen from the front in the central portion of the display screen, it is possible to increase the degree of improvement in the visual angle dependency of the gamma characteristics, as the observation object position on the display screen viewed from the viewer is more spaced apart from the central portion of the screen in the horizontal direction and/or the vertical direction.

Furthermore, according to Embodiment 1, the data signal is applied to the sub-pixel electrodes 11a and 11b included in the sub-pixels SP1 and SP2 through the TFTs 15a and 15b. The scanning signal GLSn is applied to the control electrodes of the TFTs 15a and 15b. The sub-pixel electrode 11b of the sub-pixel SP2 is connected with the discharge capacitor electrode 13 through the TFT 14. The electrode pair of the discharge capacitor electrode 13 and the discharge capacitor counter electrode 23 is included in the sub-pixel SP2. The discharge capacitor counter electrode 23 is connected to the potential of the counter electrode 21. The scanning signal GLSn+1 delayed by one horizontal scanning time from the above-described scanning signal GLSn is applied to the control electrode of the TFT 14.

Thereby, the sub-pixel electrode 11b of the sub-pixel SP2 and the discharge capacitor electrode 13 are connected with each other at a later time than the time at which the data signal is applied to the sub-pixel electrodes 11a and 11b, such that the voltage of the sub-pixel electrode 11b of the sub-pixel SP2 is changed. Therefore, it is possible there occurs a voltage difference between the voltages applied to the liquid crystal layer 3 through at least the sub-pixels SP1 and SP2 included in the pixel P.

Further, according to Embodiment 1, the magnitude of the discharge capacity formed by the discharge capacitor electrode 13 and the discharge capacitor counter electrode 23 varies depending on the arrangement position of the pixel P so that the voltage of the sub-pixel electrode 11b of the sub-pixel SP2 varies depending on the arrangement position of the pixel P. Therefore, the voltage difference between the voltages applied to the liquid crystal layer 3 through at least the sub-pixels SP1 and SP2 included in the pixel P can be changed depending on the arrangement position of the pixel P in the matrix.

Furthermore, according to Embodiment 1, an electrode pair of the auxiliary capacitor electrode 12a and the auxiliary capacitor counter electrode 22a facing each other through the insulation layer, and an electrode pair of the auxiliary capacitor electrode 12b and the auxiliary capacitor counter electrode 22b are included in the electrode pairs that define the sub-pixels SP1 and SP2 included in the pixel P. Among these, the auxiliary capacitor electrodes 12a and 12b are electrically connected to the sub-pixel electrodes 11a and 11b respectively, and the auxiliary capacitor counter electrodes 22a and 22b are connected to the potential of the counter electrode 21. The magnitude of the discharge capacity is represented by CDC. The magnitude of the liquid crystal capacitor Clc1 formed by the sub-pixel electrode 11a and the counter electrode 21, and the magnitude of the liquid crystal capacitor Clc2 formed by the sub-pixel electrode 11b and the counter electrode 21 are represented by CLC, for example. The magnitude of the auxiliary capacitor Ccs1 formed by the auxiliary capacitor electrode 12a and the auxiliary capacitor counter electrode 22a, and the magnitude of the auxiliary capacitor Ccs2 formed by the auxiliary capacitor electrode 12b and the auxiliary capacitor counter electrode 22b are represented by CCS, for example. In this case, when the TFT 14 is conductive, the voltage applied to the liquid crystal layer 3 through the sub-pixel SP2 is changed depending on k=CDC/(CDC+CLC+CCS). Herein, the magnitude of the value of k varies depending on the arrangement position of the pixel P in the row direction and/or the column direction of the matrix.

Accordingly, the voltage difference between the voltages applied to the liquid crystal layer 3 through at least the sub-pixels SP1 and SP2 included in the pixel P can be changed depending on the arrangement position of the pixel P in the matrix.

Furthermore, according to Embodiment 1, the control electrode of the TFT 14 is connected to the scanning signal line GL which is spaced apart in the row direction of the matrix. Therefore, it is not necessary to generate a particular control signal. In the case where a time which is an integral multiple of one horizontal scanning time elapses from the time when the data signal is applied to the pixel P, it is possible there occurs a voltage difference between the voltages applied to the liquid crystal layer 3 through at least the sub-pixels SP1 and SP2 included in the pixel P.

Modified Example

Embodiment 1 has the configuration in which the auxiliary capacitor counter electrodes 22a and 22b and the discharge capacitor counter electrode 23 are connected to the potential of the counter electrode 21. In the modified example of Embodiment 1, the auxiliary capacitor counter electrodes 22a and 22b and the discharge capacitor counter electrode 23 are connected to a prescribed potential different from the potential of the counter electrode 21.

Figure 10:
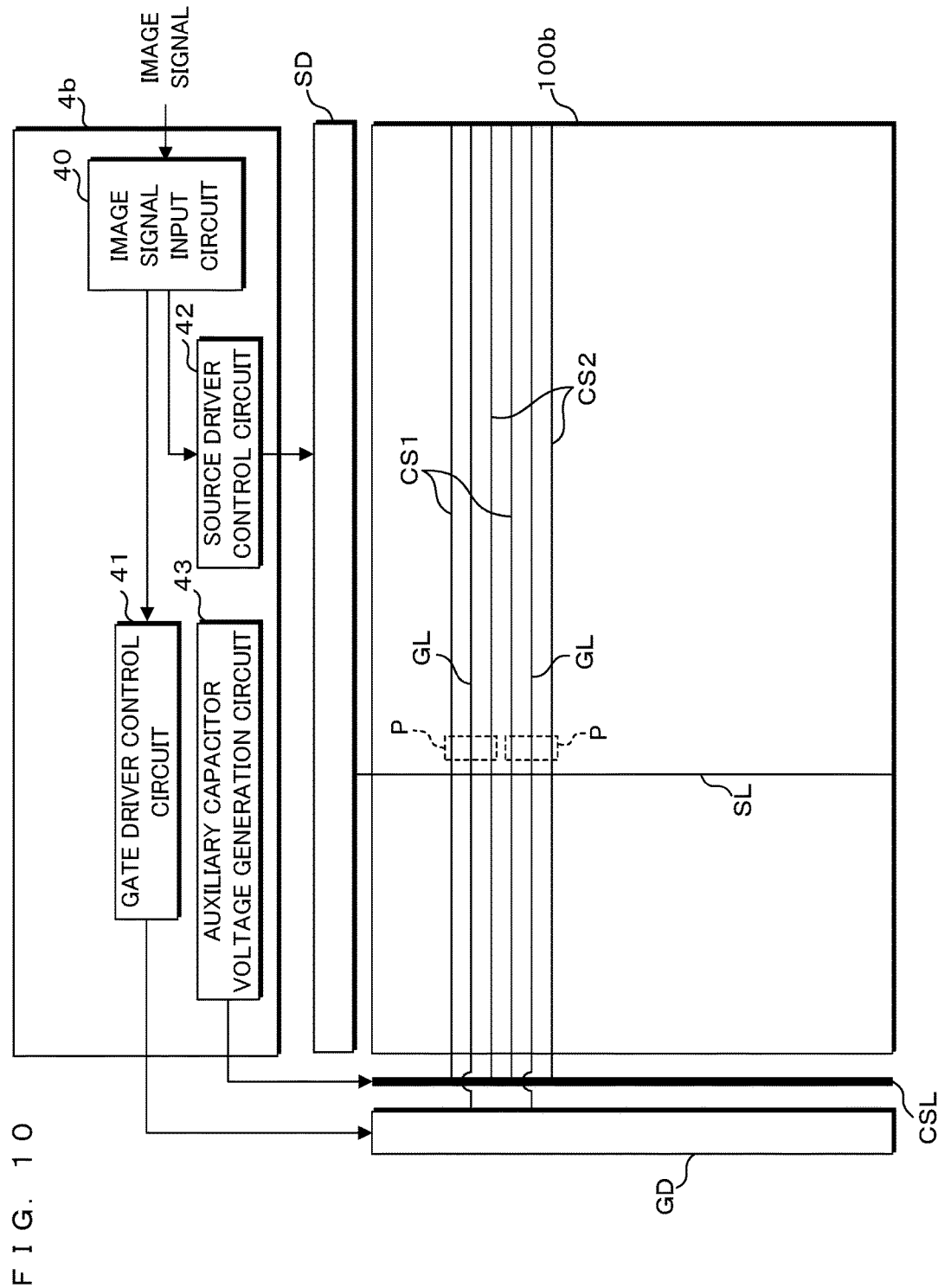
FIG. 10 is a block diagram illustrating a configuration example of a liquid crystal display apparatus according to a modified example of Embodiment 1.
Figure 11:
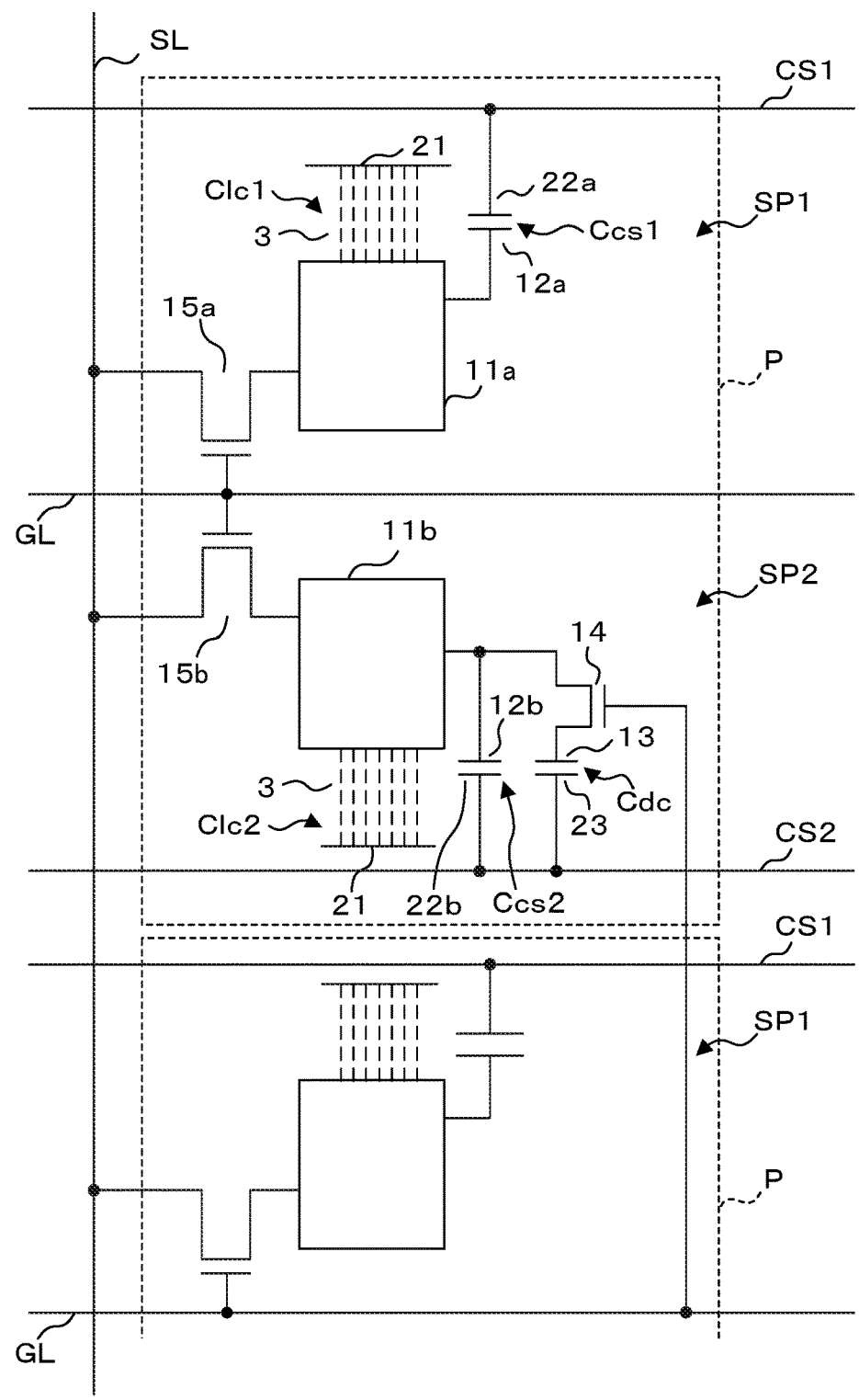
FIG. 11 is an explanatory view schematically illustrating a configuration for defining pixels in a liquid crystal panel according to the modified example of Embodiment 1.

FIG. 10 is a block diagram illustrating a configuration example of a liquid crystal display apparatus according to the modified example of Embodiment 1. FIG. 11 is an explanatory view schematically illustrating a configuration for defining pixels P in a liquid crystal panel 100b according to the modified example of Embodiment 1.

The liquid crystal display apparatus according to the modified example includes a liquid crystal panel 100b, a gate driver GD, a source driver SD, a display control circuit 4b, and an auxiliary capacitor voltage trunk wiring CSL. The auxiliary capacitor voltage trunk wiring CSL is a wiring for relaying a voltage applied from the display control circuit 4b to the liquid crystal panel 100b. Hereinafter, the components having the same configuration as the Embodiment 1 are denoted by the same reference numerals while not describing the same, and configurations different from Embodiment 1 will be described.

As compared with the liquid crystal panel 100a of Embodiment 1, the liquid crystal panel 100b has auxiliary capacitor voltage lines CS1 and CS2 disposed so as to linearly cut across the vertical both ends of the pixel P in the horizontal direction. The auxiliary capacitor voltage lines CS1 and CS2 are connected to the auxiliary capacitor voltage trunk wiring CSL outside the liquid crystal panel 100b, and are connected to auxiliary capacitor counter electrodes 22a and 22b respectively inside the liquid crystal panel 100b (see FIG. 11). The auxiliary capacitor voltage line CS2 is further connected to a discharge capacitor counter electrode 23.

As compared with the display control circuit 4a in Embodiment 1, the display control circuit 4b further has an auxiliary capacitor voltage generation circuit 43 which generates a prescribed voltage applied to the auxiliary capacitor voltage lines CS1 and CS2 through the auxiliary capacitor voltage trunk wiring CSL. The voltages applied to the auxiliary capacitor voltage lines CS1 and CS2 may be the same as or different from each other.

Next, whether Expressions (2) and (3) derived in Embodiment 1 can be applied in the present modified example will be verified. When the voltages of the auxiliary capacitor voltage lines CS1 and CS2 based on Vcom are represented by Vcs, in the present modified example, Equation (4) below is established from the charge conservation law based on Equation (1).

$$(V3-Vcs) \times (CDC+CCS)+V3 \times CLC=(V1-Vcs) \times CDC+ V2 \times CLC+(V2-Vcs) \times CCS \quad (4)$$

Equation (1) is established by adding Vcs (CDC+CCS) to both sides of Equation (4). Equations (2) and (3) are derived similarly to Embodiment 1. From this fact, according to the modified example, the same effect as that of Embodiment 1 can be achieved.

It is noted that the difference in the configuration of the present modified example with respect to the configuration of Embodiment 1 can be applied to other embodiments and modified examples thereof which will be described below.

Embodiment 2

Embodiment 1 has the configuration in which the scanning signal line GL is connected to the gate electrode of the TFT 14. Meanwhile, in Embodiment 2, another signal line different from the scanning signal line GL is connected to the gate electrode of the TFT 14.

Figure 12:
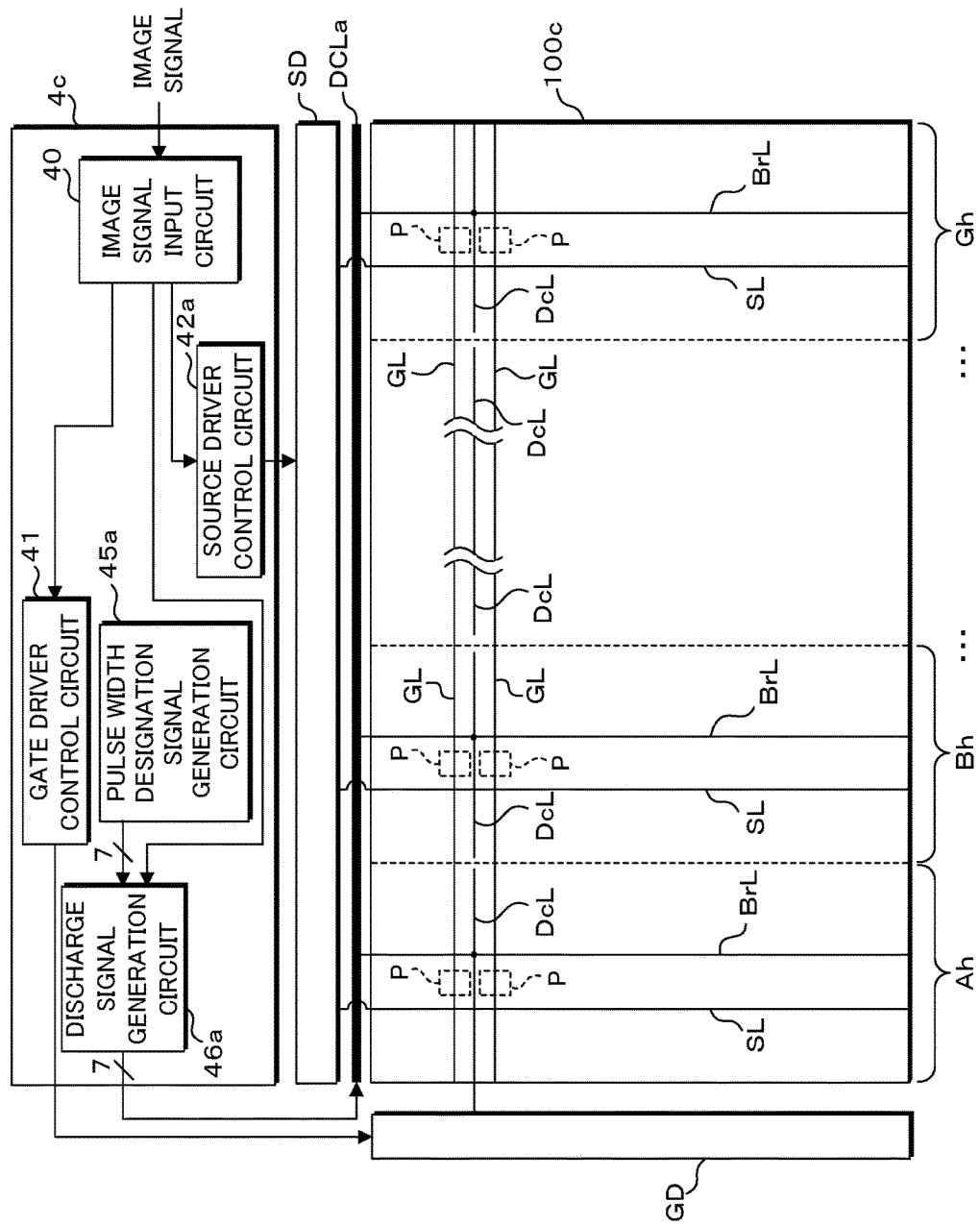
FIG. 12 is a block diagram illustrating a configuration example of a liquid crystal display apparatus according to Embodiment 2 of the present invention.
Figure 13:
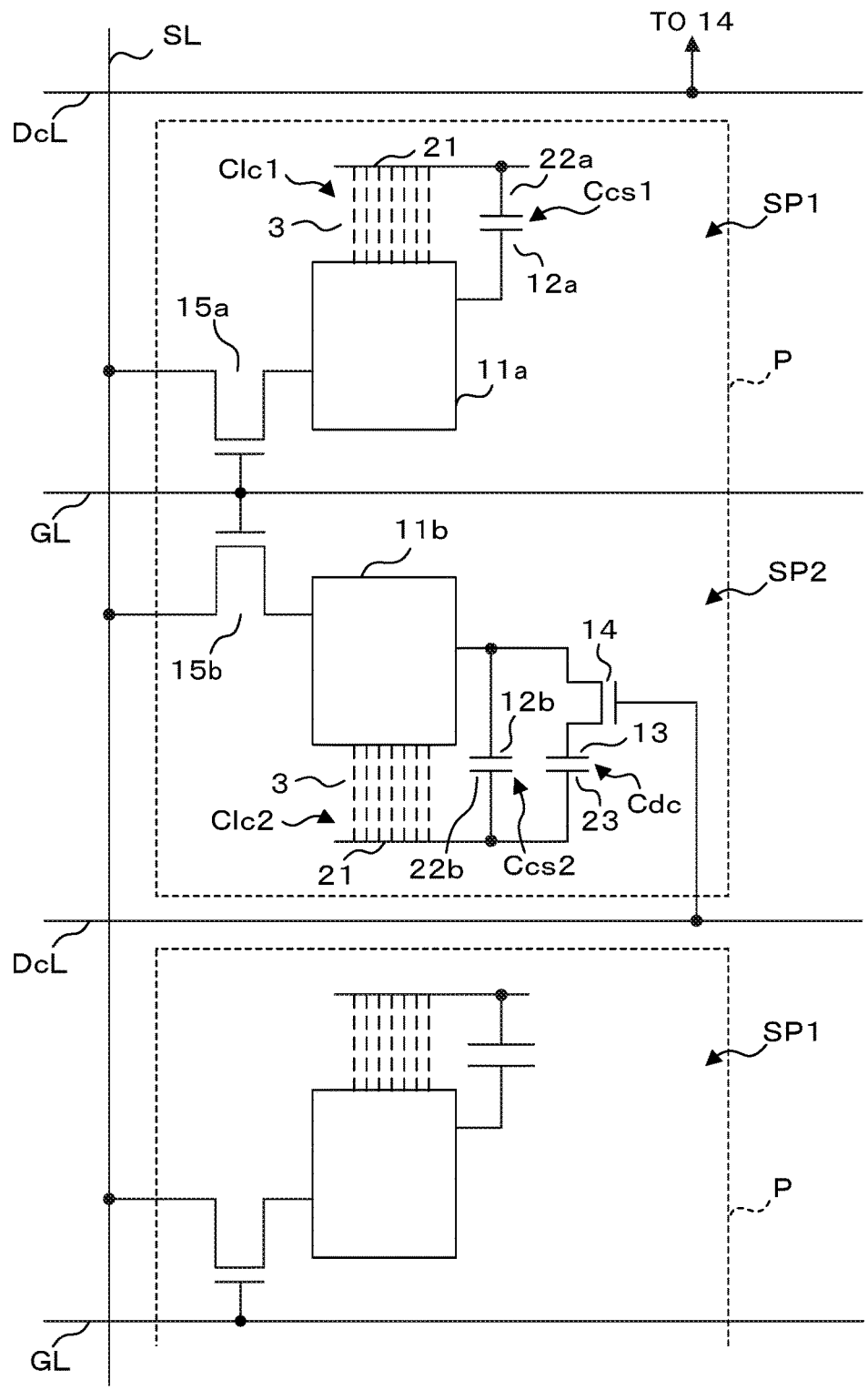
FIG. 13 is an explanatory view schematically illustrating a configuration for defining pixels in the liquid crystal panel according to Embodiment 2.

FIG. 12 is a block diagram illustrating a configuration example of a liquid crystal display apparatus according to Embodiment 2 of the present invention. FIG. 13 is an explanatory view schematically illustrating a configuration for defining the pixels P in a liquid crystal panel 100c according to Embodiment 2.

The liquid crystal display apparatus according to Embodiment 2 includes the liquid crystal panel 100c, a gate driver GD, a source driver SD, a display control circuit 4c, and a discharge signal trunk wiring DCLa. The discharge signal trunk wiring DCLa is a wiring for relaying a signal to be supplied from the display control circuit 4c to the liquid crystal panel 100*c*. Hereinafter, the components having the same configuration as the Embodiment 1 are denoted by the same reference numerals while not describing the same, and configurations different from Embodiment 1 will be described.

The liquid crystal panel 100*c* is divided into longitudinally long virtual regions from a region Ah to a region Gh in the horizontal direction. The regions Ah and Gh correspond to the left and right edge portions of the display screen respectively. The region Dh corresponds to the central portion of the display screen. The number of divisions of the display screen is not limited to seven from Ah to Gh. As compared with the liquid crystal panel 100*a* of Embodiment 1, the liquid crystal panel 100*c* includes discharge signal lines DcL linearly disposed in the horizontal direction so as to be adjacent to the pixels P, and branch lines BrL linearly disposed in the vertical direction for applying voltage signals to the discharge signal lines DcL.

The discharge signal line DcL is connected to the gate electrode of the TFT 14 (see FIG. 13).

The branch wirings BrL are connected to the discharge signal trunk wiring DCLa outside the liquid crystal panel 100*c*. The branch wirings BrL may be disposed for each column of the pixels P, and may be commonly disposed for each of the above-described regions.

As compared with the display control circuit 4*a* in Embodiment 1, the display control circuit 4*c* has a pulse width designation signal generation circuit 45*a*, and a discharge signal generation circuit (corresponding to a discharge signal line driving circuit) 46*a*. The pulse width designation signal generation circuit 45*a* generates a signal voltage which determines a signal width (that is, a pulse width) of the pulse signal to be applied to the discharge signal line DcL. The discharge signal generation circuit 46*a* generates a pulse-shaped discharge signal based on the signal generated by the pulse width designation signal generation circuit 45*a* and a timing signal from the image signal input circuit 40. The discharge signal generation circuit 46*a* applies discharge signals having different signal widths for each region in the column direction from the regions Ah to Gh to the discharge signal lines DcL through the discharge signal trunk wiring DCLa and the branch wirings BrL.

Figure 14:
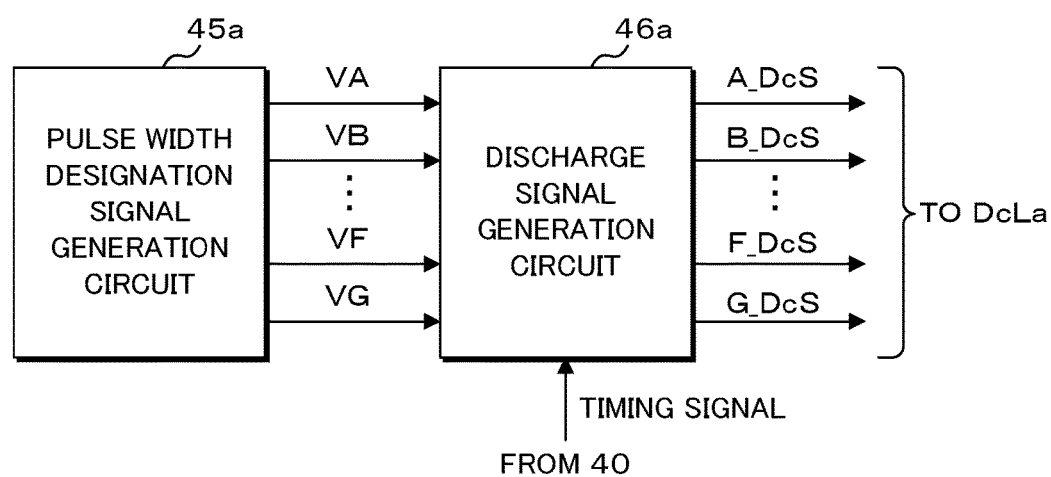
FIG. 14 is an explanatory view for explaining signals output by a pulse width designation signal generation circuit and a discharge signal generation circuit.

FIG. 14 is an explanatory view for explaining signals output by the pulse width designation signal generation circuit 45*a* and the discharge signal generation circuit 46*a*. The discharge signal generation circuit 46*a* generates discharge signals A_DcS, B_DcS, . . . and G_DcS which are delayed in time from scanning signals applied to the gate electrodes of TFTs 15*a* and 15*b*. The discharge signals A_DcS, B_DcS, . . . and G_DcS correspond to the regions Ah, Bh, . . . and Gh respectively. The discharge signal generation circuit 46*a* applies the generated discharge signal to the gate electrode of the TFT 14 through the discharge signal trunk wiring DCLa, the branch wiring BrL and the discharge signal line DcL. An amount of delay for the scanning signals of these discharge signals A_DcS, B_DcS, . . . and G_DcS may be a delay amount which is suitably larger than a time difference between the signals GLSn and GLSn+1 in Embodiment 1, and is negligible with respect to one frame period.

The pulse width designation signal generation circuit 45*a* generates signals for each region for determining the signal widths of the discharge signals A_DcS, B_DcS, . . . and G_DcS which are generated for each region by the discharge signal generation circuit 46*a*. Specifically, the pulse width designation signal generation circuit 45*a* generates signals VA, VB, . . . and VG for the regions Ah, Bh, . . . and Gh, and the discharge signal generation circuit 46*a* generates the discharge signals A_DcS, B_DcS, . . . and G_DcS based on these generated signals.

Herein, regarding the signal widths of the generated discharge signals A_DcS, B_DcS, . . . and G_DcS, the signal widths corresponding to the regions Ah and Gh are maximized and the signal width corresponding to the region Dh is minimized. Then, the signal widths are gradually decreased in an order from the region Ah to the regions Bh, Ch and Dh, and an order from the region Gh to the regions Fh, Eh and Dh. As such, by changing signal widths of the discharge signals A_DcS, B_DcS, . . . and G_DcS applied to the gate electrode of the TFT 14, an amount of charge flowing into or out of the discharge capacitor Cdc through the TFT 14 for each region in the column direction can be changed. Thereby, it is possible to achieve the same effect as that of Embodiment 1, in which the value of k is gradually changed so that the value of k=CDC/(CDC+CLC+CCS) is maximized in the regions Ah and Gh, and is minimized in the region Dh.

It is noted that, in Embodiment 2, the example, in which the pixel P has the sub-pixels SP1 and SP2, has been described. However, the number of sub-pixels is not limited to two, and may be three or more. For example, when one pixel includes three sub-pixels, the voltage difference between the effective voltages of arbitrary two sub-pixels may be changed depending on the above-described signal widths of the discharge signals A_DcS, B_DcS, . . . and G_DcS.

As described above, according to Embodiment 2, the gate electrode of the TFT 14 is connected to the discharge signal line DcL, and the discharge signal generation circuit 46*a* applies the discharge signals A_DcS, B_DcS, . . . and G_DcS, which are delayed by a prescribed time from the above-described scanning signal and have different signal widths depending on the arrangement position of the pixel P in the column direction, to the discharge signal lines DcL.

Therefore, the voltage difference between the voltages applied to the liquid crystal layer 3 through at least the sub-pixels SP1 and SP2 included in the pixel P can be changed depending on the arrangement position of the pixel P in the matrix. In particular, it is effective when the display screen of the liquid crystal panel 100*c* is curved in a cylindrical shape along the horizontal direction (lateral direction).

Modified Example

Embodiment 2 has the configuration in which the discharge signals A_DcS, B_DcS, . . . and G_DcS having different signal widths are applied to the discharge signal lines DcL depending on the arrangement position of the pixel P in the column direction. Meanwhile, the modified example of Embodiment 2 has a configuration in which discharge signals having different signal widths are applied to the discharge signal lines DcL depending on the arrangement position of the pixel P in the row direction.

Figure 15:
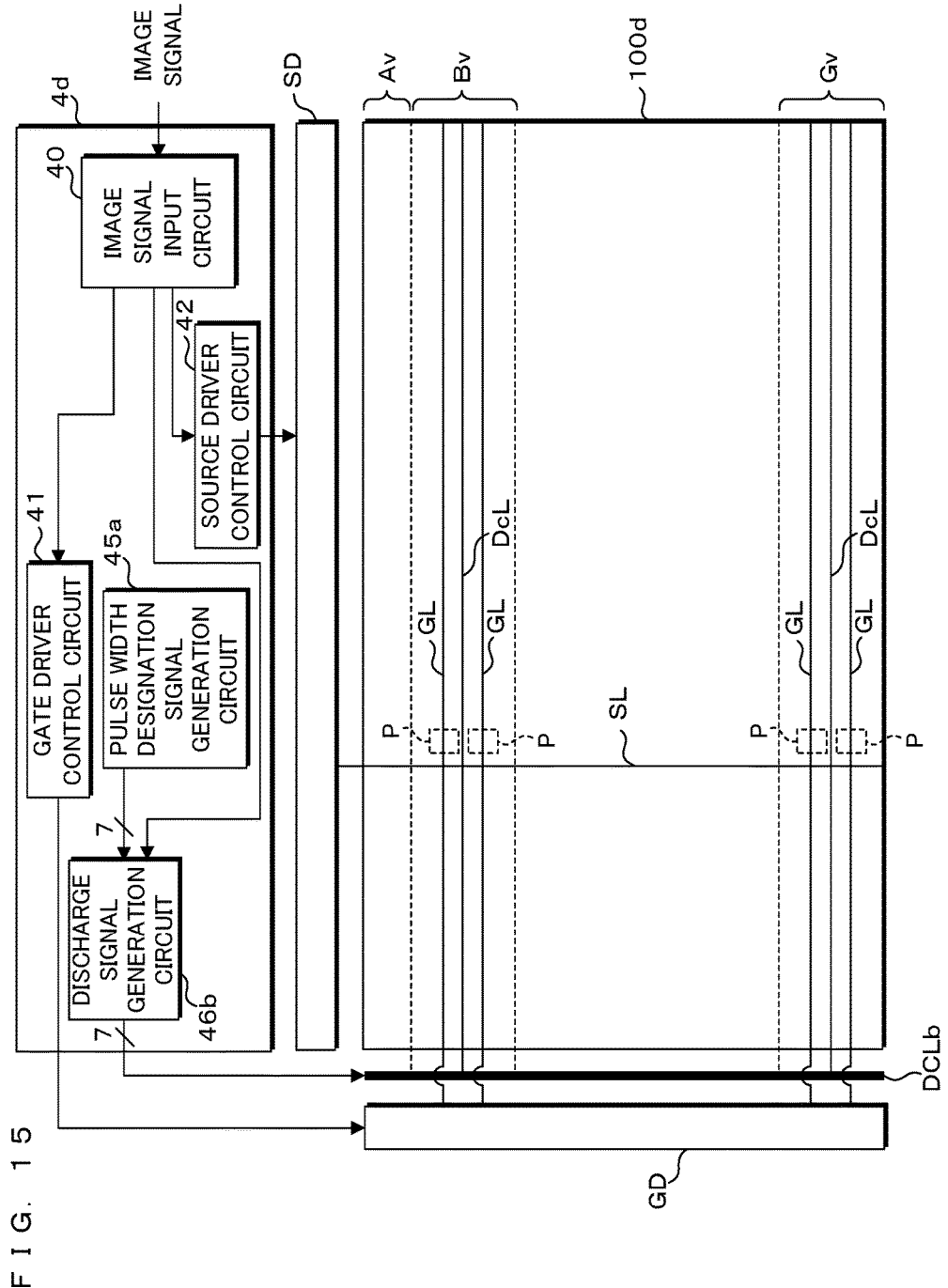
FIG. 15 is a block diagram illustrating a configuration example of a liquid crystal display apparatus according to a modified example of Embodiment 2.
Figure 16:
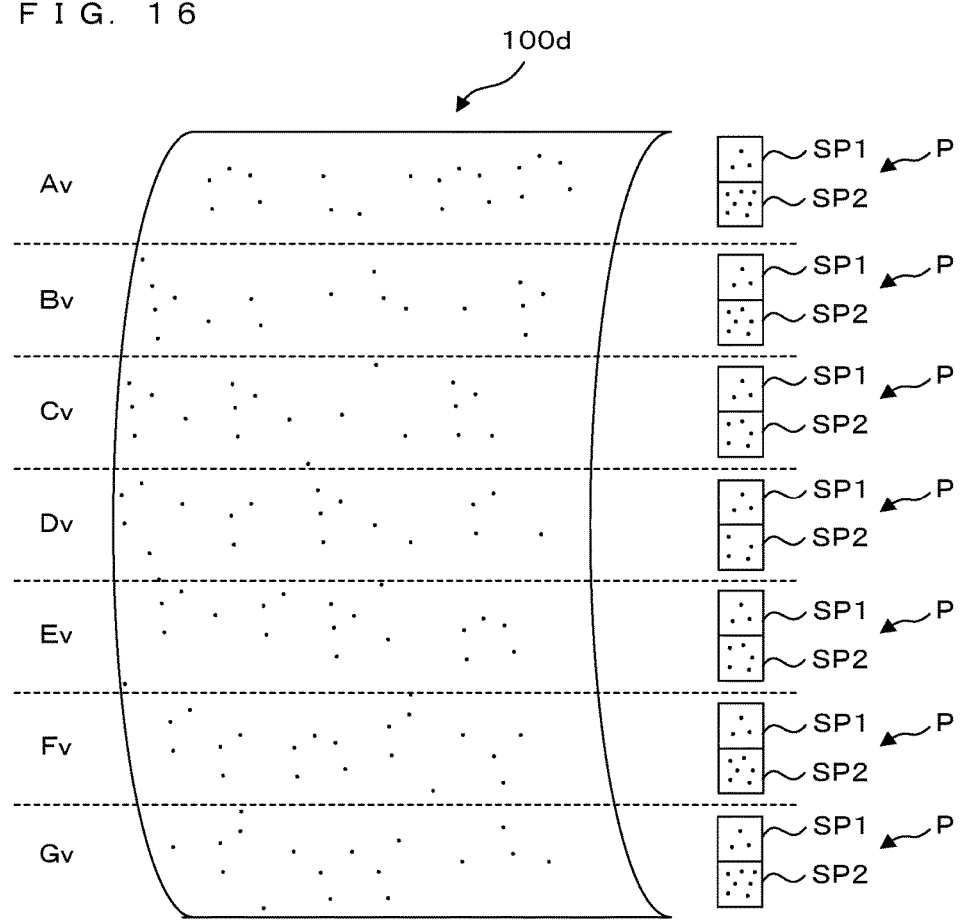
FIG. 16 is an explanatory view illustrating an example of changing a voltage difference between the effective voltages of sub-pixels depending on a vertical position on the display screen.

FIG. 15 is a block diagram illustrating a configuration example of a liquid crystal display apparatus according to the modified example of Embodiment 2. FIG. 16 is an explanatory view illustrating an example of changing a voltage difference between the effective voltages of sub-pixels depending on a vertical position on the display screen.

The liquid crystal display apparatus according to the modified example includes a liquid crystal panel 100*d*, a gate driver GD, a source driver SD, a display control circuit 4d, and a discharge signal trunk wiring DCLb. The discharge signal trunk wiring DCLb is a wiring for relaying the voltage applied from the display control circuit 4d to the liquid crystal panel 100d. Hereinafter, the components having the same configuration as the Embodiments 1 and 2 are denoted by the same reference numerals while not describing the same, and configurations different from Embodiments 1 and 2 will be described.

The liquid crystal panel 100d is divided into horizontally long virtual regions from a region Av to a region Gv in the vertical direction. The regions Av and Gv correspond to upper and lower edge portions of the display screen respectively. The region Dv corresponds to the central portion of the display screen. The number of divisions of the display screen is not limited to seven from Av to Gv. As compared with the liquid crystal panel 100a of Embodiment 1, the liquid crystal panel 100d further includes discharge signal lines DcL linearly disposed in the horizontal direction so as to be adjacent to the pixels P. The discharge signal line DcL is connected to a discharge signal trunk wiring DCLb outside the liquid crystal panel 100d, and is connected to the gate electrode of the TFT 14 inside the liquid crystal panel 100d.

When comparing the display control circuit 4d with the display control circuit 4c according to Embodiment 2, there is a difference therebetween in that the display control circuit 4d has a discharge signal generation circuit 46b which generates a pulse-shaped discharge signal based on the signal generated by the pulse width designation signal generation circuit 45a and a timing signal from the image signal input circuit 40. The discharge signal generation circuit 46b applies discharge signals (discharge signals A_DcS, B_DcS, . . . and G_DcS) having different signal widths for each region in the row direction from the regions Av to Gv through the discharge signal trunk wiring DCLb, to the discharge signal line DcL.

Regarding the signal widths of the discharge signals generated by the discharge signal generation circuit 46b, the signal widths corresponding to the regions Av and Gv are maximized, and the signal width corresponding to the region Dv is minimized. Then, the signal widths are gradually decreased in an order from the region Av to the regions By, Cv and Dv, and an order from the region Gv to the regions Fv, Ev and Dv. As such, by changing the signal width applied to the gate electrode of the TFT 14, the amount of charge flowing into or out of the discharge capacitor Cdc through the TFT 14 can be changed for each region in the row direction. Thereby, it is possible to achieve the same effect as that of Embodiment 1, in which the value of k is gradually changed so that the value of k=CDC/(CDC+CLC+ CCS) is maximized in the regions Av and Gv, and is minimized in the region Dv.

More specifically, the voltage difference between the effective voltages of the sub-pixels SP1 and SP2 included in the pixel P of each region is maximized in the regions Av and Gv, and is minimized in the region Dv. Then, the above-described voltage difference between the effective voltages is gradually decreased in an order from the region Av to the regions By, Cv and Dv, and an order from the region Gv to the regions Fv, Ev and Dv. Therefore, as illustrated in the right end portion of FIG. 16, the sub-pixel SP2 in the region Dv is displayed at a lower brightness or luminance than the sub-pixel SP1, and the brightness or luminance of the sub-pixel SP2 is gradually decreased in an order from the region Dv to the regions Cv, By and Av, and in an order from the region Dv to the regions Ev, Fv and Gv. Thereby, the brightness or luminance of the pixel P observed from the viewer is uniformly distributed across the whole of the display screen of the liquid crystal panel 100d.

As described above, according to the modified example of Embodiment 2, the gate electrode of the TFT 14 is connected to the discharge signal line DcL, and the discharge signal generation circuit 46b applies the discharge signals, which are delayed by a prescribed time from the scanning signal and have different signal widths depending on the arrangement position of pixel P in the row direction, to the discharge signal lines DcL.

Therefore, the voltage difference between the voltages applied to the liquid crystal layer 3 through at least the sub-pixels SP1 and SP2 included in the pixel P can be changed depending on the arrangement position of the pixel P in the matrix. In particular, it is effective when the display screen of the liquid crystal panel 100d is curved in a cylindrical shape along the vertical direction (longitudinal direction).

Embodiment 3

Embodiment 2 has the configuration in which, when changing the signal widths of the discharge signals A_DcS, B_DcS, . . . and G_DcS applied to the discharge signal lines DcL depending on the arrangement position of the pixel P, the viewing distance of the viewer and the curvature of the liquid crystal panel 100c are not considered. Meanwhile, Embodiment 3 has a configuration in which the viewing distance of the viewer and/or the curvature of the liquid crystal panel 100c are considered, and the signal widths of the discharge signals A_DcS, B_DcS, . . . and G_DcS applied to the discharge signal lines DcL are changed depending on the arrangement position of the pixel P.

Figure 17:
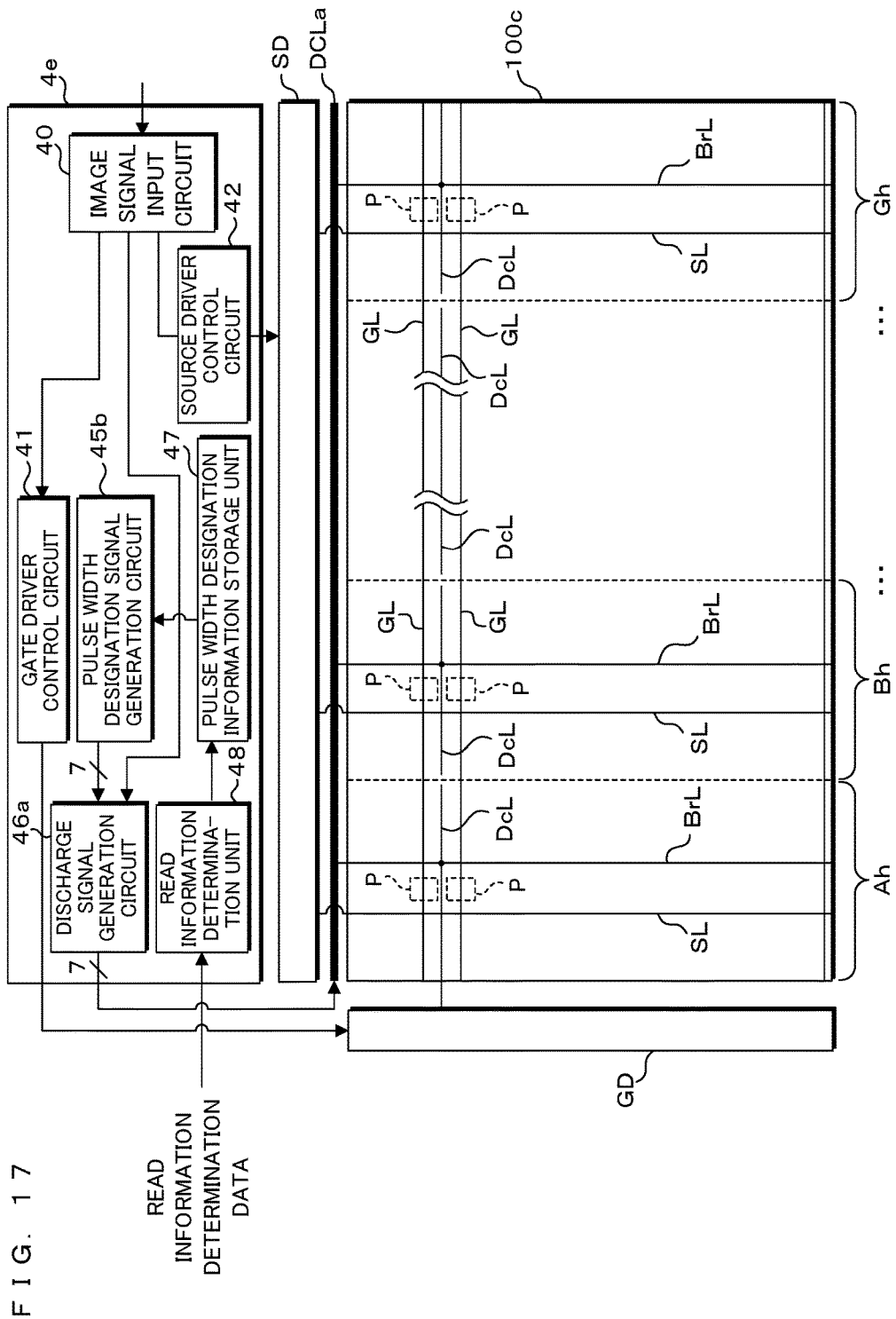
FIG. 17 is a block diagram illustrating a configuration example of a liquid crystal display apparatus according to Embodiment 3 of the present invention.

FIG. 17 is a block diagram illustrating a configuration example of a liquid crystal display apparatus according to Embodiment 3 of the present invention. The liquid crystal display apparatus according to Embodiment 3 includes a liquid crystal panel 100c, a gate driver GD, a source driver SD, a display control circuit 4e, and a discharge signal trunk wiring DCLa. The discharge signal trunk wiring DCLa is a wiring for relaying a signal supplied from the display control circuit 4e to the liquid crystal panel 100c. Hereinafter, the components having the same configuration as the Embodiments 1 and 2 are denoted by the same reference numerals while not describing the same, and configurations different from Embodiments 1 and 2 will be described.

When comparing the display control circuit 4e with the display control circuit 4c in Embodiment 2, a pulse width designation signal generation circuit 45b generates a pulse width designation signal depending on one piece of information. The display control circuit 4e further includes a pulse width designation information storage unit 47, and a read information determination unit 48. The pulse width designation information storage unit 47 stores a plurality of pieces of information designating signals VA, VB, . . . and VG to be generated by the pulse width designation signal generation circuit 45b. The read information determination unit 48 receives read information determination data from an outside, and determines one piece of information to be read from the pulse width designation information storage unit 47.

The pulse width designation signal generation circuit 45b reads out one piece of information determined by the read information determination unit 48 from the pulse width designation information storage unit 47, and generates the signals VA, VB, . . . and VG specified by the read information. Briefly, the signal widths of the discharge signals A_DcS, B_DcS, . . . and G_DcS generated by the discharge signal generation circuit 46a for each region are changed depending on the read information determination data from the outside. Thereby, the voltage difference between the voltages applied to the liquid crystal layer 3 through at least the sub-pixels SP1 and SP2 and the brightness difference or the luminance difference between at least the sub-pixels SP1 and SP2 are changed not only depending on the arrangement position of the pixel P, but also depending on the read information determination data from the outside.

It is noted that the read information determination unit 48 may give information for selecting one piece of information among the plurality of pieces of information stored in the pulse width designation information storage unit 47 to the pulse width designation signal generation circuit 45b, and the pulse width designation signal generation circuit 45b may read out one piece of information among the plurality of pieces of information stored in the pulse width designation information storage unit 47, based on the information given from the read information determination unit 48.

Next, the read information determination data will be described.

Figure 18A:
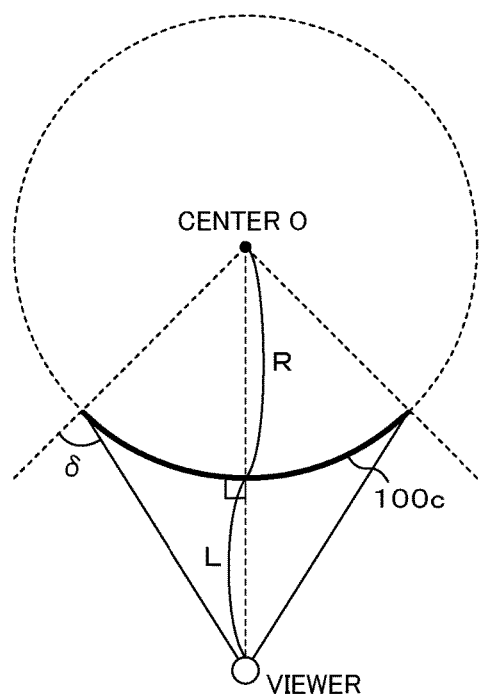
FIG. 18A is an explanatory view for explaining an angle formed by the visual line with respect to a liquid crystal panel curved convexly forward and the normal line of the display screen.
Figure 18B:
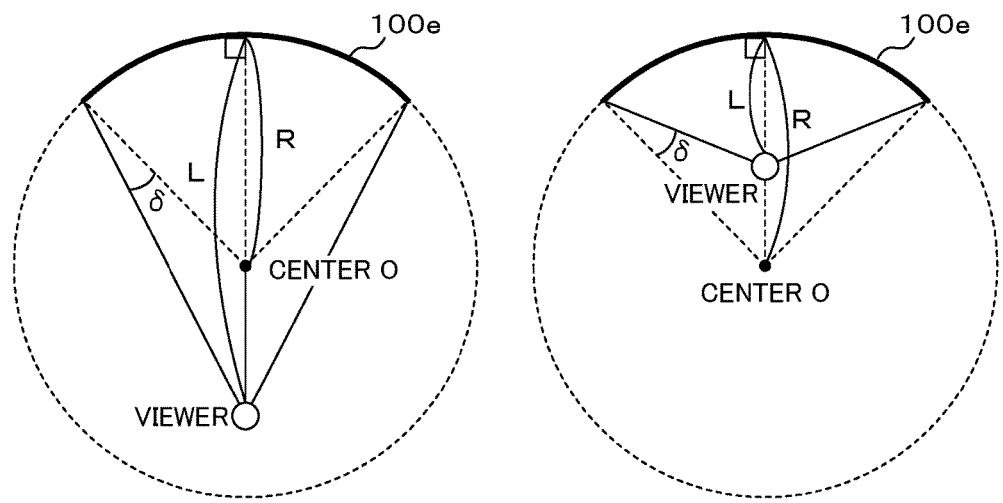
FIG. 18B is an explanatory view for explaining angles formed by the visual lines with respect to the liquid crystal panels curved convexly forward and the normal lines of the display screens.

FIG. 18A is an explanatory view for explaining an angle formed by the visual line with respect to the liquid crystal panel 100c curved convexly forward and the normal line of the display screen. FIG. 18B is an explanatory view for explaining angles formed by the visual lines with respect to the liquid crystal panels 100e curved convexly forward and the normal lines of the display screens. The two liquid crystal panels 100e illustrated in FIG. 18B are the same as each other, and the positions of the viewers with respect to the display screen are different from each other.

In the liquid crystal panels 100c and 100e illustrated in FIGS. 18A and 18B, for example, the display screens are curved in a cylindrical shape along the horizontal direction (lateral direction) so that the display screens are convex and concave forward respectively. The curvature centers of the liquid crystal panels 100c and 100e are represented by a center O. The viewer is located on a line segment connecting the central portion of the display screen and the center O or on the extension of this line segment, and faces the display screen. Herein, a separation distance between the center portion of the display screen and the position of the viewer, that is, the viewing distance is represented by L. The curvature radius of the display screen is represented by R. When the observation object position is an end portion on the display screen, the angle formed by the normal line of the display screen and the visual line of the viewer at the observation object position is represented by δ.

As illustrated in FIG. 18A, in a case where the liquid crystal panel 100c is convex forward, when the value of R is fixed, clearly, the smaller the value of L, the larger the value of δ, and when the value of L is fixed, clearly, the smaller the value of R, the larger the value of δ. It is noted that, when the value of δ becomes 90 degrees, the value of δ reaches its limit. As described above, the larger the value of δ, the more apparent the problem of the visual angle dependency of the gamma characteristics. Thereby, in a case of associating a large/small value of the read information determination data with a large/small value of L which is the viewing distance or the value of R which is the curvature radius of the display screen, one piece of information designating the signals VA, VB, . . . and VG is determined by the read information determination unit 48, so that discharge signals A_DcS, B_DcS, . . . and G_DcS having a smaller (or larger) signal width is output with increasing (or decreasing) the value of the read information determination data. It is noted that it is not necessary for the value of R to be uniform in the plane. For example, when an average value of R varies for each region, it may be configured to output the discharge signals A_DcS, B_DcS, . . . and G_DcS, signal widths of which are corrected depending on a magnitude of the value of R for each region (the rest is the same as above).

Meanwhile, as illustrated in FIG. 18B, in a case where the liquid crystal panel 100e is concave forward, when the value of R is fixed, the value of δ is decreased with increasing the value of L from 0 to the value of R (see the case on the right side of FIG. 18B), and the value of δ is increased with further increasing the value of L from the value of R (see the case on the left side of FIG. 18B). When the value of L is fixed, the value of δ is decreased with increasing the value of R from a value smaller than L to the value of L (see the case on the left side of FIG. 18B), and the value of δ is increased with further increasing the value of R from the value of L (see the case on the right side of FIG. 18B).

Therefore, in the case of associating the large/small value of the read information determination data with the large/small value of L, when L<R, one piece of information designating the signals VA, VB, . . . and VG is determined so that the discharge signals A_DcS, B_DcS, . . . and G_DcS having a smaller (or larger) signal width are output, with increasing (or decreasing) the value of the read information determination data. In addition, when L>R, one piece of information designating the signals VA, VB, . . . and VG is determined so that the discharge signals A_DcS, B_DcS, . . . and G_DcS having a larger (or smaller) signal width are output, with increasing (or decreasing) the value of the read information determination data.

In the case of associating the large/small value of the read information determination data with the large/small value of R, when R<L, one piece of information designating the signals VA, VB, . . . and VG is determined so that the discharge signals A_DcS, B_DcS, . . . and G_DcS having a smaller (or larger) signal width are output, with increasing (or decreasing) the value of the read information determination data. In addition, when R>L, one piece of information designating the signals VA, VB, . . . and VG is determined so that the discharge signals A_DcS, B_DcS, . . . and G_DcS having a larger (or smaller) signal width are output, with increasing (or decreasing) the value of the read information determination data.

From the above description, it is preferable that the storage content of the pulse width designation information storage unit 47 is changed depending on whether the liquid crystal panel is convex or concave forward. In addition, it is preferable that the storage content of the pulse width designation information storage unit 47 is further changed depending on whether the read information determination data is associated with either the value of R or the value of L. Further, when the liquid crystal panel is concave forward, it is preferable that the storage contents of the pulse width designation information storage unit 47 is further changed depending on a difference in the magnitude relationship between the value of R and the value of L. In other words, by changing the storage content of the pulse width designation information storage unit 47, in any case described above, based on the read information determination data, it is possible to determine one set of information optimum for the curvature radius and/or viewing distance of the liquid crystal panel from among a plurality of types of information stored in the pulse width designation information storage unit 47.

It is noted that, in Embodiment 3, the case where the read information determination unit 48 obtains the read information determination data from the outside, has been described. However, when the curvature radius and the viewing distance are fixedly determined, the read information determination unit 48 may not be used. In this case, the pulse width designation information storage unit 47 may store the optimum information according to the predetermined curvature radius and the predetermined viewing distance.

Meanwhile, in a case of using a liquid crystal panel, curvature radius of which is variable manually or electrically, the curvature radius may be detected when the curvature radius is changed and the data indicating the detected curvature radius may be treated as the read information determination data. Further, when the viewing distance of the viewer can be detected by, for example, a camera or sensor, data indicating the detected viewing distance may be treated as the read information determination data. Thereby, there is provided a liquid crystal display apparatus which realizes a viewing environment with presence or optimum viewing angle characteristics depending on the curvature radius of the liquid crystal panel set by the viewer or the viewing distance between the viewer and the liquid crystal display apparatus, and has a high display quality.

As described above, according to Embodiment 3, the voltage difference between the voltages applied to the liquid crystal layer 3 through at least the sub-pixels SP1 and SP2, or the brightness difference or the luminance difference between at least the sub-pixels SP1 and SP2 varies depending on the curvature radius R of the display screen of the liquid crystal panel 100c or 100e.

Accordingly, it is possible to change an improvement degree of the visual angle dependency of the gamma characteristics so as to compensate for the change in a degree of an influence in the visual angle dependency of the gamma characteristics depending on the curvature of the display screen. Further, even when the curvature radius R of the display screen is not constant in the plane, the same effect may be achieved.

In addition, according to Embodiment 3, the voltage difference between the voltages applied to the liquid crystal layer 3 through at least the sub-pixels SP1 and SP2, or the brightness difference or the luminance difference between at least the sub-pixels SP1 and SP2 varies depending on the viewing distance L from the central portion of the display screen of the liquid crystal panel 100c or 100e to the position spaced apart therefrom in the normal direction in front of the display screen.

Accordingly, it is possible to change the degree of improvement in the visual angle dependency of the gamma characteristics so as to compensate for the change in the degree of influence in the visual angle dependency of the gamma characteristics depending on the viewing distance L with respect to the display screen.

Further, according to Embodiment 3, the smaller the curvature radius (that is, the larger the curvature) of the display screen of the liquid crystal panel 100c curved convexly forward or the shorter the viewing distance, the larger the voltage difference between the voltages applied to the liquid crystal layer 3 through the sub-pixels SP1 and SP2, or the brightness difference or the luminance difference between at least the sub-pixels SP1 and SP2.

Accordingly, it is possible to change the degree of improvement in the visual angle dependency of the gamma characteristics to a large/small value, so as to compensate for that the degree of influence in the visual angle dependency of the gamma characteristics is changed to a large/small value depending on the large/small curvature of the display screen, or depending on short/long viewing distance with respect to the display screen.

It is noted that, as used herein and in the appended claims, the singular forms "a", "an", and "the" include plural referents unless the context clearly dictates otherwise.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims. In addition, technical features described in each embodiment may be combined with each other, and new technical features may be formed by the combination.

The invention claimed is:

1. A liquid crystal display apparatus, comprising:
a liquid crystal layer; and
a plurality of electrode pairs for applying a voltage to the liquid crystal layer;
wherein pixels, each of which has a plurality of sub-pixels, each of which is defined by including an electrode pair of a sub-pixel electrode and a counter electrode facing each other through the liquid crystal layer, are arranged in a matrix shape,
wherein a brightness difference or a luminance difference between a first sub-pixel and a second sub-pixel included in a same pixel becomes larger as an arrangement position of the pixel belongs to a region which is more spaced apart from a central portion in a row direction and/or a column direction of the matrix, and
wherein the second sub-pixel is defined by including an electrode pair of a discharge capacitor electrode and a discharge capacitor counter electrode connected to a prescribed potential, the discharge capacitor electrode and the discharge capacitor counter electrode facing each other through the insulation layer,
the liquid crystal display apparatus further comprising:
a first switching element and a second switching element for applying a data signal to the sub-pixel electrodes included in the first sub-pixel and the second sub-pixel;
a third switching element connected between the sub-pixel electrode of the second sub-pixel and the discharge capacitor electrode; and
a scanning signal line for applying a scanning signal to control electrodes of the first switching element and the second switching element,
wherein a signal delayed by a prescribed time from the scanning signal is applied to the control electrode of the third switching element, and
wherein, regarding the second sub-pixel, a magnitude of a discharge capacity formed by the discharge capacitor electrode and the discharge capacitor counter electrode becomes larger as the arrangement position of the pixel belongs to a region which is more spaced apart from the central portion in the row direction and/or the column direction of the matrix.

2. The liquid crystal display apparatus according to claim 1, further comprising a liquid crystal panel which includes the liquid crystal layer and the electrode pairs, a display screen of the liquid crystal being curved forward,
wherein the brightness difference or the luminance difference varies depending on a curvature of the display screen of the liquid crystal panel.

3. The liquid crystal display apparatus according to claim 2, wherein the brightness difference or the luminance difference varies depending on a distance from a central portion of the display screen of the liquid crystal panel to a position spaced apart therefrom forward in a normal direction.

4. The liquid crystal display apparatus according to claim 3, wherein a display screen of the liquid crystal panel is curved convexly forward, and
wherein the brightness difference or the luminance difference becomes larger as the curvature increases or as the distance is shorter.

5. The liquid crystal display apparatus according to claim 1, wherein each of the first sub-pixel and the second sub-pixel is defined by including an electrode pair of an auxiliary capacitor electrode and an auxiliary capacitor counter electrode connected to a prescribed potential, the auxiliary capacitor electrode and the auxiliary capacitor counter electrode facing each other through an insulation layer,
wherein the sub-pixel electrode and the auxiliary capacitor electrode are electrically connected with each other in each of the first sub-pixel and the second sub-pixel, and
wherein, regarding the second sub-pixel, a ratio of the magnitude of the discharge capacity to a sum of the magnitude of the discharge capacity, a magnitude of a liquid crystal capacitance and a magnitude of an auxiliary capacitance varies depending on the arrangement position of the pixel, the liquid crystal capacitance being formed by the sub-pixel electrode and the counter electrode, the auxiliary capacitance being formed by the auxiliary capacitor electrode and the auxiliary capacitor counter electrode.

6. The liquid crystal display apparatus according to claim 1, wherein the control electrode of the third switching element is connected to the scanning signal line spaced apart in the row direction of the matrix.

7. The liquid crystal display apparatus according to claim 1, further comprising:
a discharge signal line connected to the control electrode of the third switching element; and
a discharge signal line driving circuit configured to apply a signal delayed by a prescribed time from the scanning signal to the discharge signal line,
wherein a signal width of the signal applied by the discharge signal line driving circuit varies depending on the arrangement position of the pixel.

8. The liquid crystal display apparatus according to claim 1,
wherein a display screen configured by a plurality of pixels arranged in a matrix shape is divided into a plurality of virtual regions aligning in the row direction and/or the column direction of the matrix, and
wherein the brightness difference or the luminance difference of the pixel belonging to each region is gradually increased from the region at the central portion of the display screen to the region at the end portion of the display screen.

9. The liquid crystal display apparatus according to claim 8,
wherein the brightness difference or the luminance difference of each of the plurality of pixels belonging to a same region is substantially same.

10. A method for driving a liquid crystal display,
wherein the liquid crystal display includes:
a liquid crystal layer; and
a plurality of electrode pairs for applying a voltage to the liquid crystal layer,
wherein pixels, each of which has a plurality of sub-pixels, each of which is defined by including an electrode pair of a sub-pixel electrode and a counter electrode facing each other through the liquid crystal layer, are arranged in a matrix shape,
wherein a first sub-pixel and a second sub-pixel are included in each pixel,
wherein the second sub-pixel is defined by including an electrode pair of a discharge capacitor electrode and a discharge capacitor counter electrode connected to a prescribed potential, the discharge capacitor electrode and the discharge capacitor counter electrode facing each other through the insulation layer, and
wherein, regarding the second sub-pixel, a magnitude of a discharge capacity formed by the discharge capacitor electrode and the discharge capacitor counter electrode becomes larger as an arrangement position of the pixel belongs to a region which is more spaced apart from a central portion in a row direction and/or a column direction of the matrix,
wherein the liquid crystal display further includes:
a first switching element and a second switching element for applying a data signal to the sub-pixel electrodes included in the first sub-pixel and the second sub-pixel;
a third switching element connected between the sub-pixel electrode of the second sub-pixel and the discharge capacitor electrode; and
a scanning signal line for applying a scanning signal to control electrodes of the first switching element and the second switching element,
the method comprising:
increasing a brightness difference or a luminance difference between the first sub-pixel and the second sub-pixel included in the same pixel as the arrangement position of the pixel belongs to a region which is more spaced apart from the central portion in the row direction and/or the column direction of the matrix; and
applying a signal delayed by a prescribed time from the scanning signal to the control electrode of the third switching element.

* * * * *